(12) United States Patent
Tsatsanis et al.

(10) Patent No.: US 12,284,621 B2
(45) Date of Patent: Apr. 22, 2025

(54) USING TIME DIVISION DUPLEXING SYSTEMS IN FREQUENCY DIVISION DUPLEXING NETWORKS

(71) Applicant: VIASAT, INC., Carlsbad, CA (US)

(72) Inventors: Michail K. Tsatsanis, Huntington Beach, CA (US); Kaushik Chakraborty, San Diego, CA (US); Kenneth V. Buer, Bluff City, TN (US)

(73) Assignee: VIASAT, INC., Carlsbad, CA (US)

( * ) Notice: Subject to any disclaimer, the term of this patent is extended or adjusted under 35 U.S.C. 154(b) by 0 days.

(21) Appl. No.: 18/805,143

(22) Filed: Aug. 14, 2024

(65) Prior Publication Data

US 2025/0056453 A1 Feb. 13, 2025

Related U.S. Application Data

(63) Continuation of application No. PCT/US2023/013071, filed on Feb. 14, 2023.

(60) Provisional application No. 63/310,099, filed on Feb. 14, 2022.

(51) Int. Cl.
*H04W 56/00* (2009.01)
*H04W 72/0446* (2023.01)
*H04W 72/1263* (2023.01)

(52) U.S. Cl.
CPC ..... *H04W 56/004* (2013.01); *H04W 72/0446* (2013.01); *H04W 72/1263* (2013.01)

(58) Field of Classification Search
CPC .......... H04W 56/004; H04W 72/0446; H04W 72/1263
See application file for complete search history.

(56) References Cited

U.S. PATENT DOCUMENTS

2011/0158203 A1 6/2011 Biton

FOREIGN PATENT DOCUMENTS

| EP | 2 568 755 A1 | 3/2013 | |
| WO | 2009/063001 A2 | 5/2009 | |
| WO | WO-2023133298 A1 * | 7/2023 | ......... H04B 7/18513 |

OTHER PUBLICATIONS

International Search Report and Written Opinion for PCT/US2023/013071 dated Sep. 11, 2023, in 24 pages.
Nokia et al., "Timing relationship enhancements for NB-IoT/eMTC over NTN," 3GPP draft, R1-2111277, 3rd Generation Partnership Project (3GPP), vol. RAN WG1, No. e-Meeting: Nov. 11, 2021-Nov. 19, 2021, Nov. 6, 2021; XP 052074804, in 6 pages.
"3rd Generation Partnership Project; Technical Specification Group Radio Access Network; NR; Requirements for support of radio resource management (Release 17)", 3GPP Standard; vol. RAN WG4, No. V17.4.0, Jan. 11, 2022, pp. 68-549, XP052118536, in 482 pages.

(Continued)

*Primary Examiner* — Melvin C Marcelo
(74) *Attorney, Agent, or Firm* — Chang & Hale LLP

(57) ABSTRACT

Described herein are technologies that utilize full duplex gateway terminals in satellite networks with half duplex user equipment. The disclosed scheduling technologies incorporate the knowledge of the propagation delay between a gateway terminal and each UE in communication with the gateway terminal. Based on this propagation delay, a scheduler can allocate DL and UL time slots in a scheduling frame in a way that avoids allocating overlapping DL and UL time slots at each UE.

29 Claims, 11 Drawing Sheets

(56) References Cited

OTHER PUBLICATIONS

Samsung, "FDD Operation", 3GPP Draft, vol. RAN WG1, No. Vancouver, Canada; Jan. 22, 2018-Jan. 26, 2018, Jan. 13, 2018, XP051384891, in 3 pages.
Moderator (Ericsson): "Feature lead summary #4 on timing relationship enhancements," 3GPP Draft, vol. RAN WG1, No. e-Meeting; Aug. 17, 2020-Aug. 28, 2020, Aug. 28, 2020, XP051922841, in 66 pages.

* cited by examiner

USING TIME DIVISION DUPLEXING SYSTEMS IN FREQUENCY DIVISION DUPLEXING NETWORKS

CROSS-REFERENCE TO RELATED APPLICATIONS

This application is a continuation of Int'l App. No. PCT/US2023/013071 filed Feb. 14, 2023 and entitled "USING TIME DIVISION DUPLEXING SYSTEMS IN FREQUENCY DIVISION DUPLEXING NETWORKS," which claims priority to U.S. Prov. App. No. 63/310,099 filed Feb. 14, 2022 and entitled "SCHEDULER FOR HALF DUPLEX TERMINAL WITH FULL DUPLEX GATEWAY," each of which is expressly incorporated by reference herein in its entirety for all purposes.

BACKGROUND

Field

The present disclosure generally relates to communications systems that employ both time division duplexing and frequency division duplexing.

Description of Related Art

Communications systems may employ a variety of technologies to enable communication between devices on a network. Communications systems can use terrestrial network links, non-terrestrial network links, or a combination of these to deliver information between devices. These network links use duplexing to achieve two-way communication over a communications channel. Two forms of duplexing include time division duplexing (TDD) and frequency division duplexing (FDD). In wireless communications systems, time division duplexing uses a single frequency band or channel for both transmit and receive whereas frequency division duplexing uses different frequency bands or channels for transmit and receive.

SUMMARY

In some embodiments, the present disclosure relates to a method for scheduling time slots in a frame for a gateway terminal and a plurality of user equipment (UE) in a communications system. The method includes determining a propagation delay between the gateway terminal and each UE of the plurality of UE. The method includes determining, for each UE of the plurality of UE, one or more conflicting time slots at the UE based on the propagation delay between the gateway terminal and the UE, a conflicting time slot being a time slot in which the UE is scheduled to simultaneously transmit and receive. The method includes populating a gateway schedule subject to a constraint to avoid conflicting time slots at each UE of the plurality of UE. The method includes communicating a schedule that corresponds to the gateway schedule to each UE of the plurality of UE.

In some implementations, the schedule that corresponds to the gateway schedule for a particular UE includes a schedule with downlink time slots delayed in time relative to the gateway schedule, the delay in time equal to the propagation time associated with the particular UE, and with uplink time slots advanced in time relative to the gateway schedule, the advance in time equal to the propagation time associated with the particular UE.

In some implementations, populating the gateway schedule includes, for each UE of the plurality of UE, allocating a plurality of downlink time slots. In some implementations, populating the gateway schedule further includes, for each UE of the plurality of UE, identifying one or more uplink slots that violate the constraint to avoid conflicting time slots due at least in part to the one or more uplink slots overlapping in time with one or more of the plurality of downlink time slots.

In some implementations, populating the gateway schedule includes, for each UE of the plurality of UE, allocating a plurality of uplink time slots. In some implementations, populating the gateway schedule further includes, for each UE of the plurality of UE, identifying one or more downlink slots that violate the constraint to avoid conflicting time slots due at least in part to the one or more downlink slots overlapping in time with one or more of the plurality of uplink time slots.

In some implementations, the propagation delay of a particular UE changes. In some implementations, the gateway schedule is updated responsive to a change in the propagation delay of the particular UE. In some implementations, the propagation delay of the particular UE varies over time.

In some embodiments, the present disclosure relates to a scheduler in a communications system that includes a gateway terminal and a plurality of user equipment (UE). The scheduler includes a data store configured to store computer executable instructions for scheduling downlink and uplink time slots of a frame in the communications system. The scheduler also includes a processor in communication with the data store. The processor is configured to execute the computer executable instructions to perform the following: determine a propagation delay between the gateway terminal and each UE of the plurality of UE; determine, for each UE of the plurality of UE, one or more conflicting time slots at the UE based on the propagation delay between the gateway terminal and the UE, a conflicting time slot being a time slot in which the UE is scheduled to simultaneously transmit and receive; populate a gateway schedule subject to a constraint to avoid conflicting time slots at each UE of the plurality of UE; and communicate a schedule that corresponds to the gateway schedule to each UE of the plurality of UE.

In some implementations, the scheduler is incorporated into the gateway terminal of the communications system. In some implementations, the schedule that corresponds to the gateway schedule for a particular UE includes a schedule with downlink time slots delayed in time relative to the gateway schedule, the delay in time equal to the propagation time associated with the particular UE, and with uplink time slots advanced in time relative to the gateway schedule, the advance in time equal to the propagation time associated with the particular UE.

In some implementations, populating the gateway schedule includes, for each UE of the plurality of UE, allocating a plurality of downlink time slots. In some implementations, populating the gateway schedule further includes, for each UE of the plurality of UE, identifying one or more uplink slots that violate the constraint to avoid conflicting time slots due at least in part to the one or more uplink slots overlapping in time with one or more of the plurality of downlink time slots.

In some implementations, the propagation delay of a particular UE changes. In some implementations, the gateway schedule is updated responsive to a change in the propagation delay of the particular UE. In some implementations, the propagation delay of the particular UE varies over time.

In some embodiments, the present disclosure relates to a communications system that includes a plurality of user equipment (UE) configured for half duplex operation; a gateway terminal configured for full duplex operation, the gateway terminal configured to communicate with each UE of the plurality of UE; and a scheduler in communication with the gateway terminal. The scheduler is configured to schedule time slots of a frame in the communications system by performing the following: determine a propagation delay between the gateway terminal and each UE of the plurality of UE; determine, for each UE of the plurality of UE, one or more conflicting time slots at the UE based on the propagation delay between the gateway terminal and the UE, a conflicting time slot being a time slot in which the UE is scheduled to simultaneously transmit and receive; populate a gateway schedule subject to a constraint to avoid conflicting time slots at each UE of the plurality of UE; and communicate a schedule that corresponds to the gateway schedule to each UE of the plurality of UE.

In some implementations, the scheduler is incorporated into the gateway terminal of the communications system. In some implementations, the schedule that corresponds to the gateway schedule for a particular UE includes a schedule with downlink time slots delayed in time relative to the gateway schedule, the delay in time equal to the propagation time associated with the particular UE, and with uplink time slots advanced in time relative to the gateway schedule, the advance in time equal to the propagation time associated with the particular UE.

In some implementations, populating the gateway schedule includes, for each UE of the plurality of UE, allocating a plurality of downlink time slots. In some implementations, populating the gateway schedule further includes, for each UE of the plurality of UE, identifying one or more uplink slots that violate the constraint to avoid conflicting time slots due at least in part to the one or more uplink slots overlapping in time with one or more of the plurality of downlink time slots.

In some implementations, the propagation delay of a particular UE changes. In some implementations, the gateway schedule is updated responsive to a change in the propagation delay of the particular UE. In some implementations, the propagation delay of the particular UE varies over time.

In some implementations, at least one UE of the plurality of UE has a propagation delay that is greater than or equal to a duration of one time slot in the gateway schedule. In some implementations, at least one UE of the plurality of UE has a propagation delay that is greater than or equal to a duration of two consecutive time slots in the gateway schedule.

In some implementations, the present disclosure relates to a method for scheduling time slots in a frame for a gateway terminal and a plurality of user equipment (UE) in a communications system. The method includes generating an initial gateway schedule for the gateway terminal that allocates a plurality of downlink time slots for each UE of the plurality of UE and that allocates a plurality of uplink time slots for each UE of the plurality of UE. The method includes for each UE, determining an initial UE schedule based on a propagation delay between the UE and the gateway terminal, the initial UE schedule including a plurality of downlink time slots delayed in time relative to the corresponding plurality of downlink time slots in the initial gateway schedule, the delay in time equal to the propagation delay between the UE and the gateway terminal, the initial UE schedule also including a plurality of uplink time slots advanced in time relative to the corresponding plurality of uplink time slots in the initial gateway schedule, the advance in time equal to the propagation delay between the UE and the gateway terminal. The method includes determining one or more conflicting time slots in the initial gateway schedule, a conflicting time slot being a time slot in which a downlink time slot and an uplink time slot for a particular UE overlap in time. The method includes generating an intermediate gateway schedule by removing one or more conflicting time slots from the initial gateway schedule, each removed time slot from the initial gateway schedule comprising an unfulfilled demand slot associated with a particular UE. The method includes generating a final gateway schedule by cycling through each unfulfilled demand slot and assigning the unfulfilled demand slot in an open time slot in the intermediate gateway responsive to determining that assigning the unfulfilled demand slot to the open time slot does not result in a conflicting time slot for the UE associated with the unfulfilled demand slot.

In some implementations, the one or more conflicting time slots removed from the initial gateway schedule comprise uplink time slots. In some implementations, the one or more conflicting time slots removed from the initial gateway schedule comprise downlink time slots. In some implementations, the intermediate gateway schedule does not include any conflicting time slots after removing the one or more conflicting time slots. In some implementations, the method further includes determining the propagation delay for each UE. In some implementations, the one or more unfulfilled demand slots are assigned to the final gateway schedule based at least in part on a priority of the UE associated with the unfulfilled demand slot.

In some implementations, the method further includes generating a final UE schedule for each UE of the plurality of UE, the final UE schedule of a particular UE including a plurality of downlink time slots delayed in time relative to the corresponding plurality of downlink time slots in the final gateway schedule, the delay in time equal to the propagation delay between the UE and the gateway terminal, the final UE schedule of the particular UE also including a plurality of uplink time slots advanced in time relative to the corresponding plurality of uplink time slots in the final gateway schedule, the advance in time equal to the propagation delay between the UE and the gateway terminal. In some implementations, the method further includes communicating the final UE schedule of each UE to the corresponding UE of the plurality of UE.

In some implementations, the initial gateway schedule is generated by cycling through each UE and sequentially allocating the plurality of downlink time slots and the plurality of uplink time slots in the frame. In some implementations, at least one unfulfilled demand slot remains unassigned in the final gateway schedule.

In some implementations, the present disclosure relates to a scheduler in a communications system that includes a gateway terminal and a plurality of user equipment (UE). The scheduler includes a data store configured to store computer executable instructions for scheduling downlink and uplink time slots of a frame in the communications system; and a processor in communication with the data store. The processor configured to execute the computer executable instructions to perform the following: generate an initial gateway schedule for the gateway terminal that allocates a plurality of downlink time slots for each UE of the plurality of UE and that allocates a plurality of uplink time slots for each UE of the plurality of UE; for each UE, determine an initial UE schedule based on a propagation delay between the UE and the gateway terminal, the initial UE schedule including a plurality of downlink time slots delayed in time relative to the corresponding plurality of downlink time slots in the initial gateway schedule, the delay in time equal to the propagation delay between the UE and the gateway terminal, the initial UE schedule also including a plurality of uplink time slots advanced in time relative to the corresponding plurality of uplink time slots in the initial gateway schedule, the advance in time equal to the propagation delay between the UE and the gateway terminal; determine one or more conflicting time slots in the initial gateway schedule, a conflicting time slot being a time slot in which a downlink time slot and an uplink time slot for a particular UE overlap in time; generate an intermediate gateway schedule by removing one or more conflicting time slots from the initial gateway schedule, each removed time slot from the initial gateway schedule comprising an unfulfilled demand slot associated with a particular UE; and generate a final gateway schedule by cycling through each unfulfilled demand slot and assigning the unfulfilled demand slot in an open time slot in the intermediate gateway responsive to determining that assigning the unfulfilled demand slot to the open time slot does not result in a conflicting time slot for the UE associated with the unfulfilled demand slot.

In some implementations, the scheduler is incorporated into a gateway terminal of the communications system. In some implementations, the one or more conflicting time slots removed from the initial gateway schedule comprise uplink time slots. In some implementations, the one or more conflicting time slots removed from the initial gateway schedule comprise downlink time slots. In some implementations, the intermediate gateway schedule does not include any conflicting time slots after removing the one or more conflicting time slots. In some implementations, the processor is further configured to determine the propagation delay for each UE. In some implementations, the one or more unfulfilled demand slots are assigned to the final gateway schedule based at least in part on a priority of the UE associated with the unfulfilled demand slot. In some implementations, at least one unfulfilled demand slot remains unassigned in the final gateway schedule.

In some embodiments, the present disclosure relates to a communications system that includes a plurality of user equipment (UE) configured for half duplex operation; a gateway terminal configured for full duplex operation, the gateway terminal configured to communicate with each UE of the plurality of UE; and a scheduler in communication with the gateway terminal. The scheduler is configured to schedule time slots of a frame in the communications system by performing the following: generate an initial gateway schedule for the gateway terminal that allocates a plurality of downlink time slots for each UE of the plurality of UE and that allocates a plurality of uplink time slots for each UE of the plurality of UE; for each UE, determine an initial UE schedule based on a propagation delay between the UE and the gateway terminal, the initial UE schedule including a plurality of downlink time slots delayed in time relative to the corresponding plurality of downlink time slots in the initial gateway schedule, the delay in time equal to the propagation delay between the UE and the gateway terminal, the initial UE schedule also including a plurality of uplink time slots advanced in time relative to the corresponding plurality of uplink time slots in the initial gateway schedule, the advance in time equal to the propagation delay between the UE and the gateway terminal; determine one or more conflicting time slots in the initial gateway schedule, a conflicting time slot being a time slot in which a downlink time slot and an uplink time slot for a particular UE overlap in time; generate an intermediate gateway schedule by removing one or more conflicting time slots from the initial gateway schedule, each removed time slot from the initial gateway schedule comprising an unfulfilled demand slot associated with a particular UE; and generate a final gateway schedule by cycling through each unfulfilled demand slot and assigning the unfulfilled demand slot in an open time slot in the intermediate gateway responsive to determining that assigning the unfulfilled demand slot to the open time slot does not result in a conflicting time slot for the UE associated with the unfulfilled demand slot.

In some implementations, the scheduler is incorporated into a gateway terminal of the communications system. In some implementations, the one or more conflicting time slots removed from the initial gateway schedule comprise uplink time slots. In some implementations, the one or more conflicting time slots removed from the initial gateway schedule comprise downlink time slots. In some implementations, the intermediate gateway schedule does not include any conflicting time slots after removing the one or more conflicting time slots. In some implementations, the scheduler is further configured to determine the propagation delay for each UE. In some implementations, the one or more unfulfilled demand slots are assigned to the final gateway schedule based at least in part on a priority of the UE associated with the unfulfilled demand slot. In some implementations, at least one unfulfilled demand slot remains unassigned in the final gateway schedule.

In some implementations, at least one UE of the plurality of UE has a propagation delay that is greater than or equal to a duration of one time slot in the final gateway schedule. In some implementations, at least one UE of the plurality of UE has a propagation delay that is greater than or equal to a duration of two consecutive time slots in the final gateway schedule.

For purposes of summarizing the disclosure, certain aspects, advantages and novel features have been described herein. It is to be understood that not necessarily all such advantages may be achieved in accordance with any particular embodiment. Thus, the disclosed embodiments may be carried out in a manner that achieves or optimizes one advantage or group of advantages as taught herein without necessarily achieving other advantages as may be taught or suggested herein.

BRIEF DESCRIPTION OF THE DRAWINGS

Various embodiments are depicted in the accompanying drawings for illustrative purposes and should in no way be interpreted as limiting the scope of this disclosure. In addition, various features of different disclosed embodiments can be combined to form additional embodiments, which are part of this disclosure.

DETAILED DESCRIPTION OF SOME EMBODIMENTS

Figure 1:
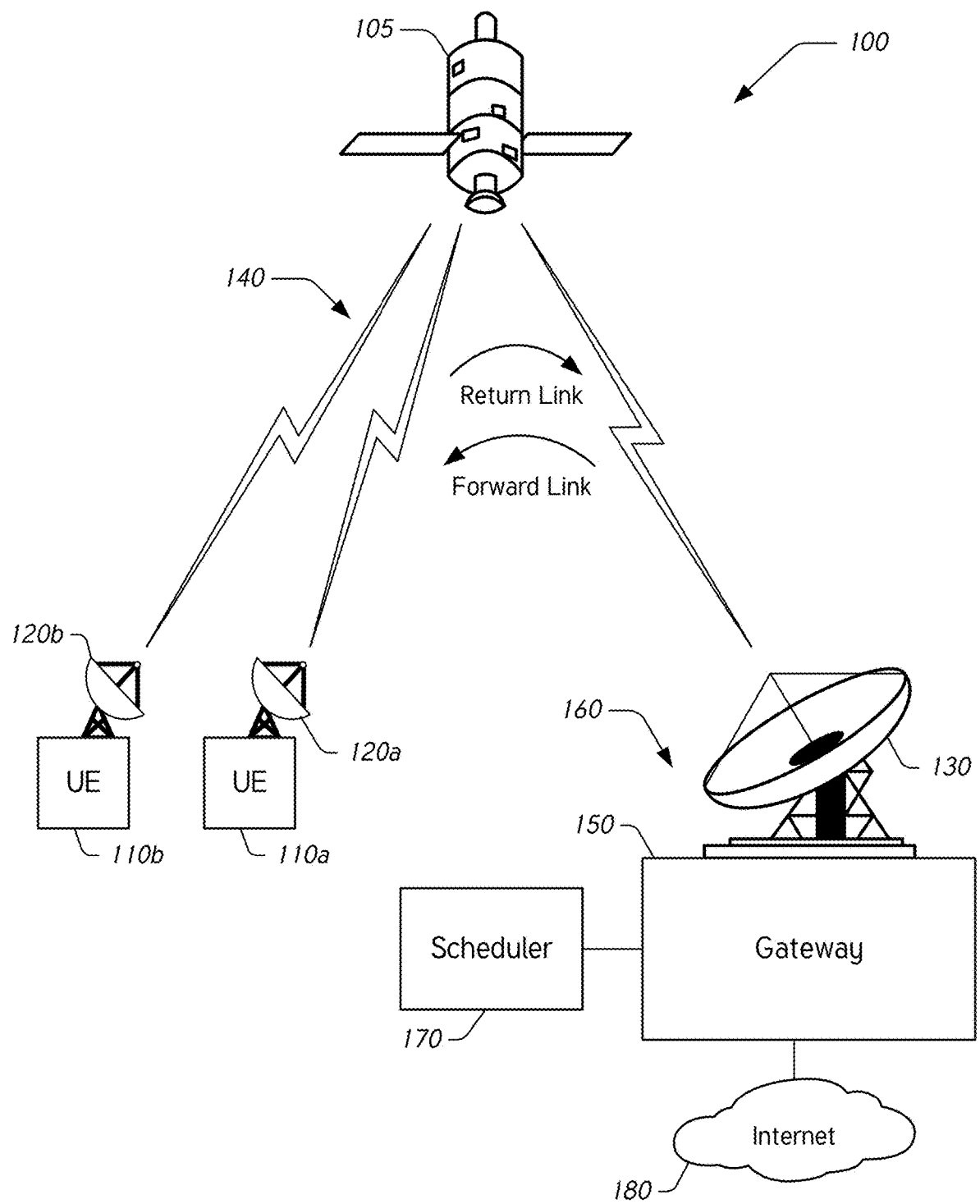
FIG. 1 illustrates a diagram of an example communications system that uses a satellite network to communicatively couple a plurality of user equipment (UE) and a gateway terminal to one another to provide access to a network (such as the Internet).

The headings provided herein, if any, are for convenience only and do not necessarily affect the scope or meaning of the claimed subject matter.

Overview

Certain wireless communications systems, such as cellular networks, can have base stations and user equipment (UE), such as a cellular phone, capable of frequency division duplexing (FDD). This means that different carrier frequencies or channels are used for downlink (DL) and uplink (UL) transmissions. In such systems, it may be desirable to have all UE transmissions aligned when they arrive at the base station. To achieve this alignment, a timing advance is employed for each UE, the timing advance being equal to the propagation delay between the base station and the UE. The timing advance is used to advance the transmission time at the UE so that transmissions from the user equipment arrive at the base station at a targeted time. For UE with larger propagation delays, this may result in transmit time slots and receive time slots overlapping in time at the UE. This would require the UE to have a full duplex modem. This overlap at the UE happens due to the propagation delay and may happen even where a scheduler schedules only transmit and receive time slots that do not overlap at the base station.

In other wireless communications systems, including cellular networks, the base stations and UE utilize time division duplexing (TDD) rather than FDD. This means that the same carrier frequency or channel is used for both downlink (DL) and uplink (UL) transmissions. Consequently, in a TDD frame there is typically a series of DL time slots and a series of UL time slots separated by a gap period to allow the equipment to switch between transmitting (Tx) and receiving (Rx). The duration of the gap period is at least two times the propagation delay (resulting from the signal propagating between the base station and the user equipment, e.g., the propagation delay from the base station to the user equipment and the propagation delay from the user equipment back to the base station, or the round-trip time). During the gap period, no traffic is scheduled. In a terrestrial communications system, the gap period may be relatively small, introducing a relatively small amount of overhead into the system.

User equipment can be modified to enable communication over satellite networks rather than, or in addition to, terrestrial networks. However, the propagation delay in a typical satellite network is significantly larger than for a typical terrestrial network. Consequently, when employing TDD scheduling as described above, the gap period becomes undesirably large due to this larger propagation delay. This introduces an undesirably large amount of overhead into the system and fails to utilize available network resources.

Accordingly, to address these and other issues, described herein are technologies that utilize full duplex gateway terminals in satellite networks with half duplex user equipment. The disclosed scheduling technologies incorporate the knowledge of the propagation delay between a gateway terminal and each UE in communication with the gateway terminal. Based on this propagation delay, a scheduler can allocate DL and UL time slots in a scheduling frame in a way that avoids allocating overlapping DL and UL time slots at each UE.

Advantageously, because a single gateway terminal can service many UE, using a full duplex gateway terminal with half duplex UE can more fully utilize available network resources without the relatively large cost associated with requiring each UE be full duplex. As described herein, the scheduling technologies enable the use of half duplex UE with full duplex components in a communications system while also efficiently utilizing network resources. For example, a scheduler can allocate DL and UL time slots in a scheduling frame in such a way as to avoid overlapping DL and UL time slots at each UE while still allocating most or all of the available time slots. This can be accomplished due at least in part to the scheduler being aware of the propagation delay to individual UE.

Example Communications Systems

FIG. 1 illustrates a diagram of an example communications system 100 that uses a satellite network 140 to communicatively couple a plurality of user equipment (UE) 110a, 110b and a gateway terminal 150 to one another to provide access to a network (such as the Internet 180). The communications system 100 includes a scheduler 170 configured to allocate network resources to the gateway terminal 150 and the UE 110a, 110b. As described in greater detail herein, the scheduler 170 is configured to allocate transmit and receive time slots in a scheduling frame to avoid overlapping transmit and receive time slots at each UE 110a, 110b while allowing overlapping transmit and receive time slots at the gateway terminal 150. The scheduler 170 accomplishes this due at least in part to being configured to determine a propagation delay between each UE 110a, 110b and the gateway terminal 150. Based on this determination, the scheduler 170 is configured to determine which time slots would overlap at each UE 110a, 110b and to allocate transmit and/or receive time slots so that no transmit time slots overlap with any receive time slots at and for each UE 110*a*, 110*b*. In this way, the gateway terminal 150 can be full duplex while each UE 110*a*, 110*b* can be half duplex.

The satellite network 140 includes a satellite 105 to provide a satellite link in the communications system 100. Each UE 110*a*, 110*b* includes a UE transceiver 120*a*, 120*b* that is configured to transmit and receive radio frequency (RF) signals with the satellite 105. By way of example, and without limitation, a UE 110*a*, 110*b* can be a handheld terminal or a very small aperture terminal (VSAT) with an integrated antenna (e.g., a parabolic antenna). In some implementations, the UE transceivers 120*a*, 120*b* are separate from the UE 110*a*, 110*b* such that the UE 110*a*, 110*b* are operatively coupled to the UE transceivers 120*a*, 120*b*. Similarly, the gateway terminal 150 is operatively coupled to a gateway satellite transceiver 130 that is configured to transmit and receive signals with the satellite 105. The gateway terminal 150 and the gateway satellite transceiver 130 can be integrated together into a ground station 160.

The satellite network 140 provides a forward link (FL) for sending information from the gateway terminal 150 to the UE 110*a*, 110*b* and a return link (RL) for sending information from the UE 110*a*, 110*b* to the gateway terminal 150. The forward link includes a transmission path from the ground station 160 through the satellite 105 via a satellite uplink (UL) channel and to the UE 110*a*, 110*b* via a satellite downlink (DL) channel. The return link includes a transmission path from the UE 110*a*, 110*b* through the satellite 105 via the satellite uplink channel and to the ground station 160 via the satellite downlink channel. It is to be understood that each communication path may utilize multiple satellites and transceivers. The satellite network 140 implements an FDD scheme meaning that the satellite UL channel uses a different frequency band from the satellite DL channel. Thus, the satellite network 140 may be referred to herein as an FDD network.

The scheduler 170 is configured to allocate DL and UL time slots to the gateway terminal 150 and to the UE 110*a*, 110*b*. In some implementations, the scheduler 170 is a separate component of the communications system 100. In some implementations, part or all of the gateway terminal 150 and/or the scheduler 170 can be located in a virtual device residing in a public or private computing cloud and/or as a part of a distributed computing environment. The scheduler 170 can be configured to allocate network resources among the UE 110*a*, 110*b* and the gateway terminal 150 to enable TDD user equipment (such as the UE 110*a*, 110*b*) to use an FDD network (such as the satellite network 140 with the gateway terminal 150).

The scheduler 170 is configured to perform one or more methods to allocate network resources among the UE 110*a*, 110*b* and the gateway terminal 150. The scheduler 170 is configured to determine a propagation delay between each UE 110*a*, 110*b* and the gateway terminal 150. The scheduler 170 is further configured to determine for each UE 110*a*, 110*b* a number of time slots in the scheduling frame that will be in conflict at the corresponding UE based on the propagation delay between the gateway terminal 150 and the corresponding UE. The scheduler 170 is further configured to populate a schedule based on this conflict determination to avoid creating conflicts at each UE. The scheduler 170 then communicates the populated schedules to the corresponding UE 110*a*, 110*b* and the gateway terminal 150.

In some implementations, the UE 110*a* may or may not be co-located with the UE 110*b*, which may result in different propagation delays between the UE 110*a* and the UE 110*b* and the gateway terminal 150. In some implementations, the UE 110*a* may represent a population of user terminals and the UE 110*b* may represent another population of user terminals. In some implementations, one or more of the UE 110*a*, 110*b* can be mobile (for example, located on a moving platform or vehicle such as an aircraft, ship, bus, train, etc.) resulting in propagation delays that change over time.

The communications system 100 may utilize various network architectures that include space and ground segments. The satellite network 140 incorporates these elements to provide communications between the plurality of UE 110*a*, 110*b* and the gateway terminal 150. For example, the space segment may include one or more satellites (such as the satellite 105), while the ground segment may include one or more satellite user terminals (such as the UE 110*a*, 110*b*), gateway terminals (such as the gateway terminal 150), network operations centers (NOCs), satellite and gateway terminal command centers, ground stations, base stations, and/or the like. Some of these elements are not shown in the figure for the sake of clarity. The satellite network 140 can include a geosynchronous earth orbit (GEO) satellite or satellites, a medium earth orbit (MEO) satellite or satellites, and/or a low earth orbit (LEO) satellite or satellites. It should be understood that the satellite 105 may represent one or more satellites and that the one or more satellites may include GEO satellites, MEO satellites, LEO satellites, or any combination of these.

Example Schedules for Components of Communications Systems

Figure 2:
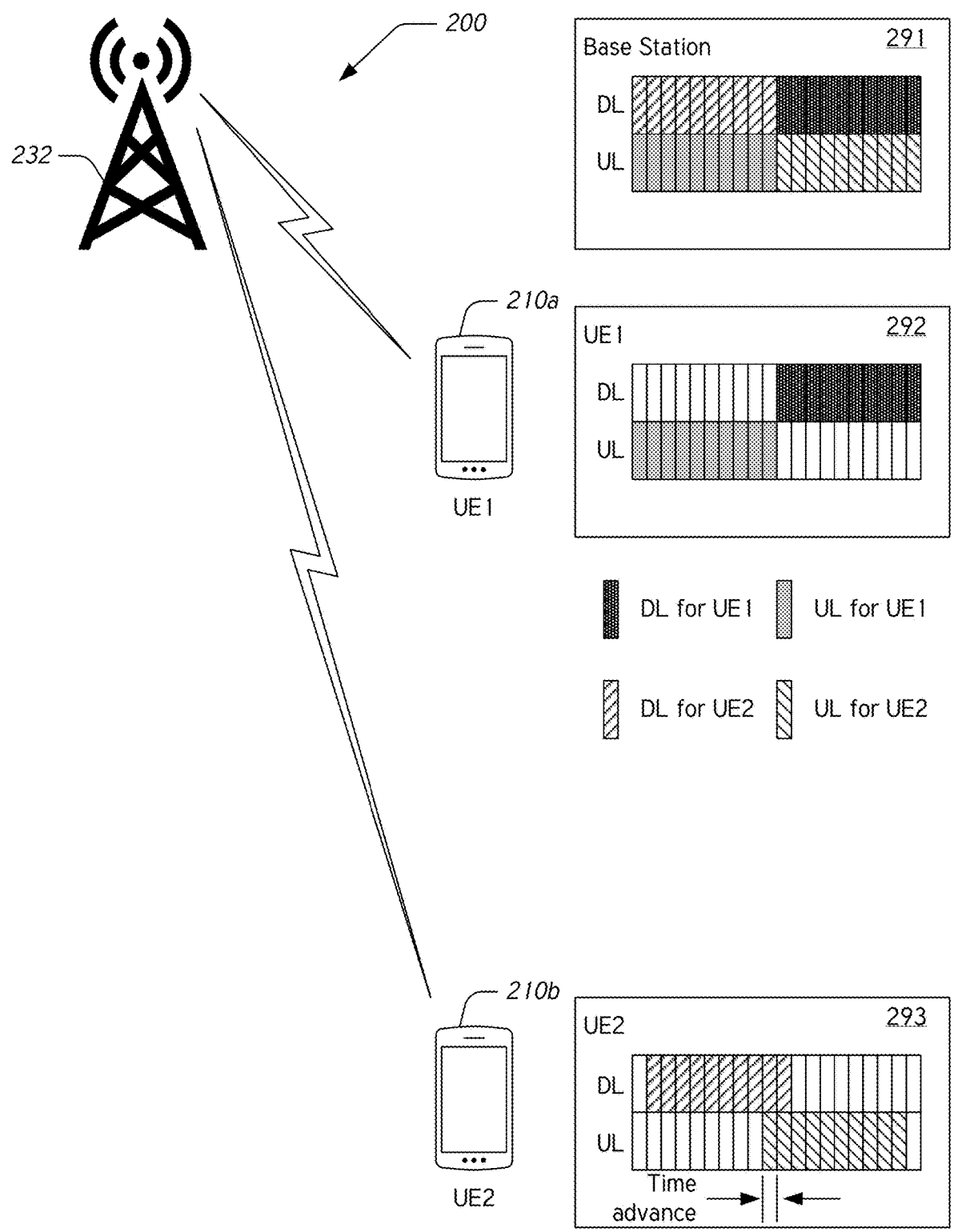
FIG. 2 illustrates an example cellular communications system that includes a base station with a first UE and a second UE both in communication with the base station.

FIG. 2 illustrates an example cellular communications system 200 that includes a base station 232 with a first UE 210*a* and a second UE 210*b* both in communication with the base station 232. The base station 232 is full duplex and configured for FDD communication. The first UE 210*a* and the second UE 210*b* are each full duplex and also capable of FDD communication. In the cellular communications system 200, the first UE 210*a* is positioned near the base station 232 and the second UE 210*b* is positioned relatively far from the base station 232. As a result, the propagation delay between the base station 232 and the first UE 210*a* is small or nearly zero and the propagation delay between the base station 232 and the second UE 210*b* is relatively large. In some implementations, the propagation delay associated with the second UE 210*b* may represent the maximum propagation delay in the cellular communications system 200. In this example, the propagation delay for the second UE 210*b* is about equal to the duration of a single time slot in a scheduling frame.

Each component in the cellular communications system 200 is assigned a network allocation schedule. The schedule includes a plurality of DL time slots and a plurality of UL time slots arranged in a scheduling frame. A base station schedule 291 is configured to align in time DL time slots and UL time slots at the base station 232 when transmissions arrive from the UE 210*a*, 210*b*. That is, the DL and UL time slots assigned to the first UE 210*a* are aligned in time in the base station schedule 291 and the DL and UL time slots assigned to the second UE 210*b* are aligned in time in the base station schedule 291. To accomplish the alignment shown in the base station schedule 291, the first UE schedule 292 allocates a plurality of DL time slots and a plurality of UL time slots for the UE 210*a* wherein the time slots align in time with the allocated time slots in the base station schedule 291. This is because the propagation delay between the base station 232 and the first UE 210*a* is negligible due at least in part to the physical proximity of the first UE 210*a* to the base station 232.

To accomplish the targeted alignment in the base station schedule 291, the second UE schedule 293 includes DL time slots that overlap with UL time slots for the UE 210*b*. In this example, the propagation delay of the second UE 210*b* is about the same duration as one time slot in the schedule. As a result, the DL transmission from the base station 232 arrives at the second UE 210*b* one time slot after they are transmitted. Furthermore, to achieve the targeted transmission arrival time at the base station 232 of the UL transmission from the UE 210*b*, the second UE schedule 293 allocates UL time slots one time slot in advance of when the UL transmission is to arrive at the base station 232. That is, there is a time advance in the UL time slots, with respect to when the UL transmission from the UE 210*b* is expected to arrive at the base station 232, equal to the propagation delay. This time advance in conjunction with the propagation delay of the DL transmission from the base station 232 to the second UE 210*b* results in two overlapping time slots in the second UE schedule 293. That is, the last 2 DL time slots overlap with the first 2 UL time slots in the second UE schedule 293. The second UE schedule 293 thus requires the second UE 210*b* to be capable of full duplex communication to accommodate this second UE schedule 293. This happens despite the base station schedule 291 including only non-overlapping UL and DL time slots for each UE.

Figure 3:
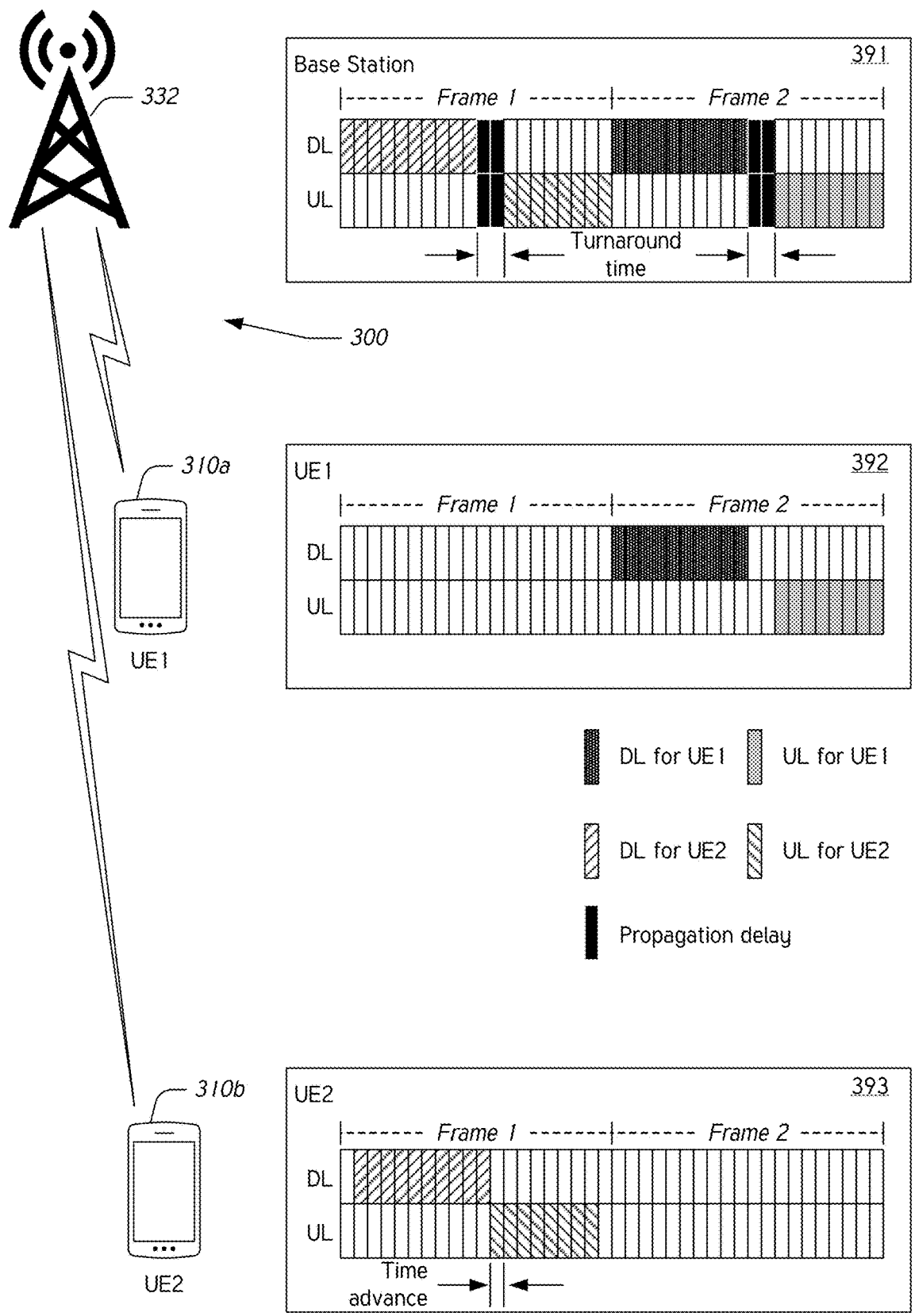
FIG. 3 illustrates another example cellular communications system that includes a base station with a first UE and a second UE both in communication with the base station.

FIG. 3 illustrates another example cellular communications system 300 that includes a base station 332 with a first UE 310*a* and a second UE 310*b* both in communication with the base station 332. In contrast to the cellular communications system 200, the base station 332 is half duplex and configured for TDD communication. Likewise, the first UE 310*a* and the second UE 310*b* are each half duplex and also configured for TDD communication. Similar to the cellular communications system 200, the first UE 310*a* is positioned near the base station 332 and the second UE 310*b* is positioned relatively far from the base station 332. As a result, the propagation delay between the base station 332 and the first UE 310*a* is small or nearly zero and the propagation delay between the base station 332 and the second UE 310*b* is relatively large. In some implementations, the propagation delay associated with the second UE 310*b* may represent the maximum propagation delay in the cellular communications system 300. In this example, the propagation delay for the second UE 310*b* is about equal to the duration of a single time slot in a scheduling frame.

Each component in the cellular communications system 300 is assigned a network allocation schedule. The schedule includes a plurality of DL time slots and a plurality of UL time slots arranged in a scheduling frame. A base station schedule 391 is configured to align in time DL time slots and UL time slots at the base station 332 when transmissions arrive from the UE 310*a*, 310*b*. That is, the DL and UL time slots assigned to the first UE 310*a* are aligned in time in the base station schedule 391 and the DL and UL time slots assigned to the second UE 310*b* are aligned in time in the base station schedule 391. However, in contrast to the cellular communications system 200, the schedules of the cellular communications system 300 account for the propagation delays of the UE 310*a*, 310*b* by incorporating a turnaround time equal to two times the maximum propagation delay in the system. The turnaround time in this example is two time slots. Thus, the base station schedule 391 includes two time slots between the DL time slots and the UL time slots in each scheduling frame where no traffic is scheduled to be transmitted or received. The base station schedule 391 also schedules communication with the first UE 310*a* in a first scheduling frame and communication with the second UE 310*b* in a second scheduling frame.

To accomplish the alignment shown in the base station schedule 391, the first UE schedule 392 allocates a plurality of DL time slots and a plurality of UL time slots for the UE 310*a* wherein the time slots align in time with the allocated time slots in the base station schedule 391. This is because the propagation delay between the base station 332 and the first UE 310*a* is negligible due at least in part to the physical proximity of the first UE 310*a* to the base station 332. Consequently, the first UE schedule 392 also includes two time slots between the DL time slots and the UL time slots to account for the maximum propagation delay in the system.

To accomplish the alignment shown in the base station schedule 391, the second UE schedule 393 allocates DL time slots adjacent in time to the UL time slots for the UE 310*b*. For example, the second UE schedule 393 does not include empty time slots between the DL time slots and the UL time slots. In this example, the propagation delay of the second UE 310*b* is about the same duration as one time slot in the schedule. As a result, the DL transmission from the base station 332 arrive at the second UE 310*b* one time slot after they are transmitted. Furthermore, to achieve the targeted transmission arrival time at the base station 332 of the UL transmission from the UE 310*b*, the second UE schedule 393 allocates UL time slots one time slot in advance of when the UL transmission is to arrive at the base station 332. That is, there is a time advance in the UL time slots, with respect to when the UL transmission from the UE 310*b* is expected to arrive at the base station 332, equal to the propagation delay. This time advance in conjunction with the propagation delay of the DL transmissions from the base station 332 to the second UE 310*b* requires the gap of two time slots in the base station schedule 391 to avoid overlapping time slots in the second UE schedule 393. Thus, the time gap to account for the turnaround time in the base station schedule 391 allows the second UE 310*b* to be half duplex.

Figure 4:
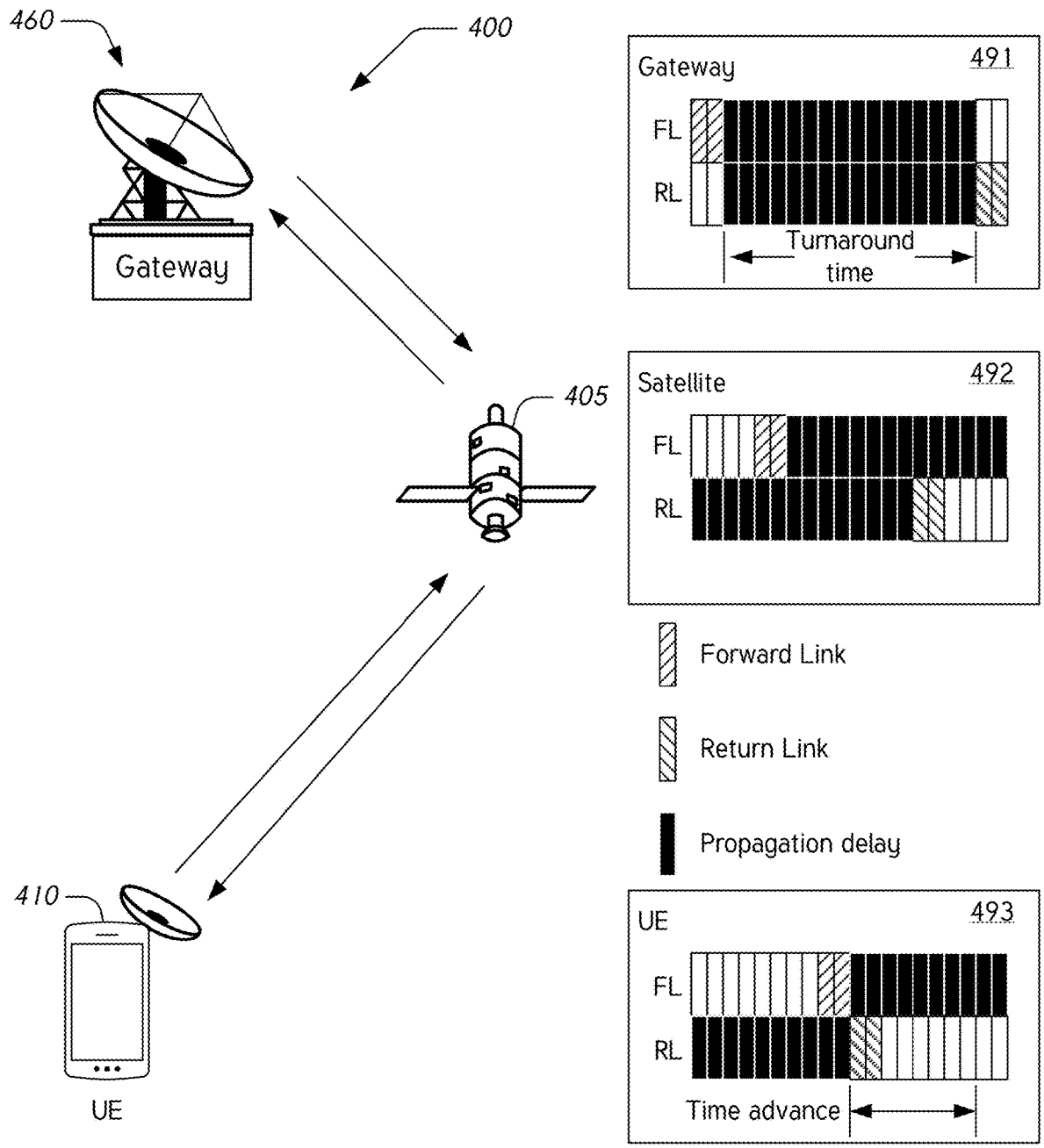
FIG. 4 illustrates an example satellite communications system that includes a ground station and a UE in communication with each other through a satellite.

FIG. 4 illustrates an example satellite communications system 400 that includes a ground station 460 and a UE 410 in communication with each other through a satellite 405. The ground station 460 is similar to the ground station 160 of FIG. 1 and the UE 410 is similar to the UE 110*a*, 110*b* of FIG. 1. The ground station 460 and the UE 410 each implement TDD schemes. In the satellite communications system 400, the propagation delay between the ground station 460 and the UE 410 is significantly larger than the propagation delay in the cellular communications system 200 of FIG. 2 and the cellular communications system 300 of FIG. 3. This is due at least in part to the larger distances the signals travel between the ground station 460 and the UE 410 compared to the distances the signals travel in a typical terrestrial cellular communications system. In this example, the propagation delay between the ground station 460 and the UE 410 is about 8 time slots, meaning that the turnaround time is about equal to the duration of 16 time slots.

To accomplish targeted scheduling, similar to the scheduling described herein with reference to FIG. 3, the turnaround time is accounted for in a gateway schedule 491. A satellite schedule 492 also illustrates the effect of the propagation delay between the ground station 460 and the satellite 405. A UE schedule 493 is configured to include only non-overlapping forward link (FL) and return link (RL) time slots because the UE 410 is half duplex. Due to the propagation delay as described herein, the gateway schedule 491 includes a large number of unused time slots to account for the turnaround time. This is undesirable because it is an inefficient use of network resources.

By way of example, the scheduling frame can have a duration of about 10 ms. A typical propagation delay in a satellite communications system can be about 4 ms, resulting in a turnaround time of about 8 ms. The turnaround time causes approximately 80% of the time slots in the scheduling frame to be unused.

Accordingly, described herein are scheduling technologies that address the inefficiencies and impracticalities of satellite communications systems with half duplex equipment used for the ground station and the user equipment. The scheduling technologies are implemented in satellite communications systems with full duplex ground stations and half duplex UE. This configuration is advantageous because it increases network utilization while not requiring the UE to utilize full duplex modems, which may be expensive. Advantageously, a single ground station or gateway terminal can be configured to service many UE. This makes it less expensive to utilize a full duplex gateway terminal than to utilize full duplex UE because the equipment cost would be dominated by the expense of the UE. Thus, the scheduling technologies described herein are modified relative to typical scheduling technologies to account for TDD user equipment being used in an FDD network.

FIGS. 5A, 5B, 5C, and 5D illustrate scheduling frames generated by scheduling technologies (e.g., schedulers, and so forth) that determine potential conflicting DL and UL time slots based on a propagation delay between the corresponding UE and a gateway terminal. The scheduler is configured to determine the propagation delay for each UE in the communications system and to determine which time slots, if allocated to a particular UE, would result in a conflict at that particular UE. As used herein, conflicting time slots in a schedule are time slots that, if allocated to a particular UE, would require that UE to simultaneously transmit and receive. Similarly, as used herein, conflicting time slots include DL time slots that overlap in time with UL time slots in a scheduling frame for a particular UE. In these examples, there are four UE with different propagation delays between a gateway terminal and the UE. The first UE has no propagation delay, the second UE has a propagation delay equal to the duration of about one time slot, the third UE has a propagation delay equal to the duration of about two time slots, and the fourth UE has a propagation delay equal to the duration of about three time slots.

In each example, a scheduling frame or a portion of a scheduling frame is shown. Each scheduling frame includes a plurality of DL time slots and a plurality of UL time slots. Because each UE is half duplex, the UE are not capable of simultaneously transmitting and receiving. Thus, a scheduler will not schedule a DL time slot that conflicts with a UL time slot at a particular UE and vice versa. However, because the gateway terminal is full duplex, the scheduler is free to schedule overlapping DL and UL time slots at the gateway.

Figure 5A:
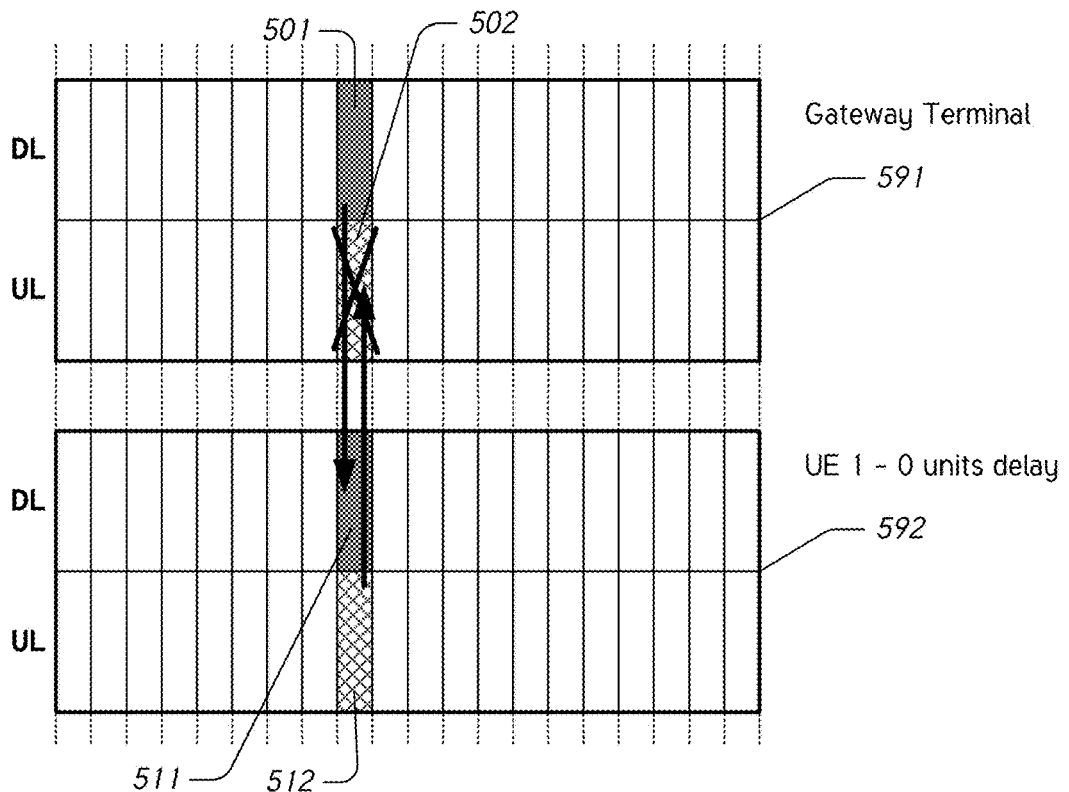
FIG. 5A illustrates an example of a scheduler determining a conflicting time slot for a gateway schedule and a first UE schedule.

FIG. 5A illustrates an example of a scheduler determining a conflicting time slot for a gateway schedule 591 and a first UE schedule 592. The propagation delay between the gateway and the first UE is negligible (e.g., less than one time slot in duration). A scheduler can allocate a DL time slot 501 in the gateway schedule 591 which results in the scheduler allocating a corresponding DL time slot 511 in the first UE schedule 592, the DL time slots 501, 511 aligned in time due to the negligible propagation delay. As a result, the scheduler identifies that allocating the UL time slot 502 in the gateway schedule 591 would result in a conflicting UL time slot 512 in the first UE schedule 592. Accordingly, the scheduler is configured to not allocate the UL time slot 502 to the gateway terminal for transmission to the first UE. However, the UL time slot 502 may be allocated for a different UE subject to the conflict analysis described herein. The conflict analysis being the analysis performed by the scheduler to determine whether allocating a particular time slot in a scheduling frame would result in a conflict between DL and UL time slots in a particular UE.

Figure 5B:
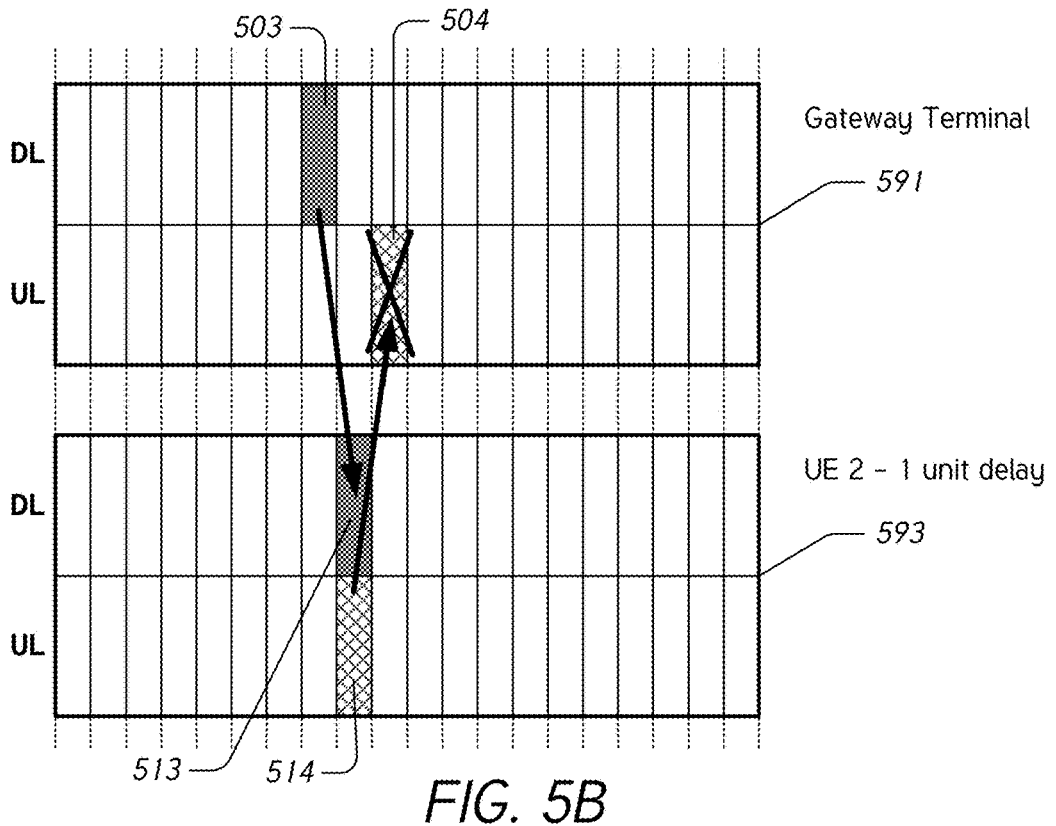
FIG. 5B illustrates an example of a scheduler determining a conflicting time slot for a gateway schedule and a second UE schedule.

FIG. 5B illustrates an example of a scheduler determining a conflicting time slot for a gateway schedule 591 and a second UE schedule 593. The propagation delay between the gateway and the second UE is about equal to the duration of one time slot. The scheduler can allocate a DL time slot 503 in the gateway schedule 591 which results in the scheduler allocating a corresponding DL time slot 513 in the second UE schedule 593, the DL time slots 503, 513 offset in time by one time slot due to the propagation delay. As a result, the scheduler identifies that allocating the UL time slot 504 in the gateway schedule 591 would result in a conflicting UL time slot 514 in the second UE schedule 593. Accordingly, the scheduler is configured to not allocate the UL time slot 504 to the gateway terminal for transmission to the second UE. However, the UL time slot 504 may be allocated for a different UE subject to the conflict analysis described herein.

Figure 5C:
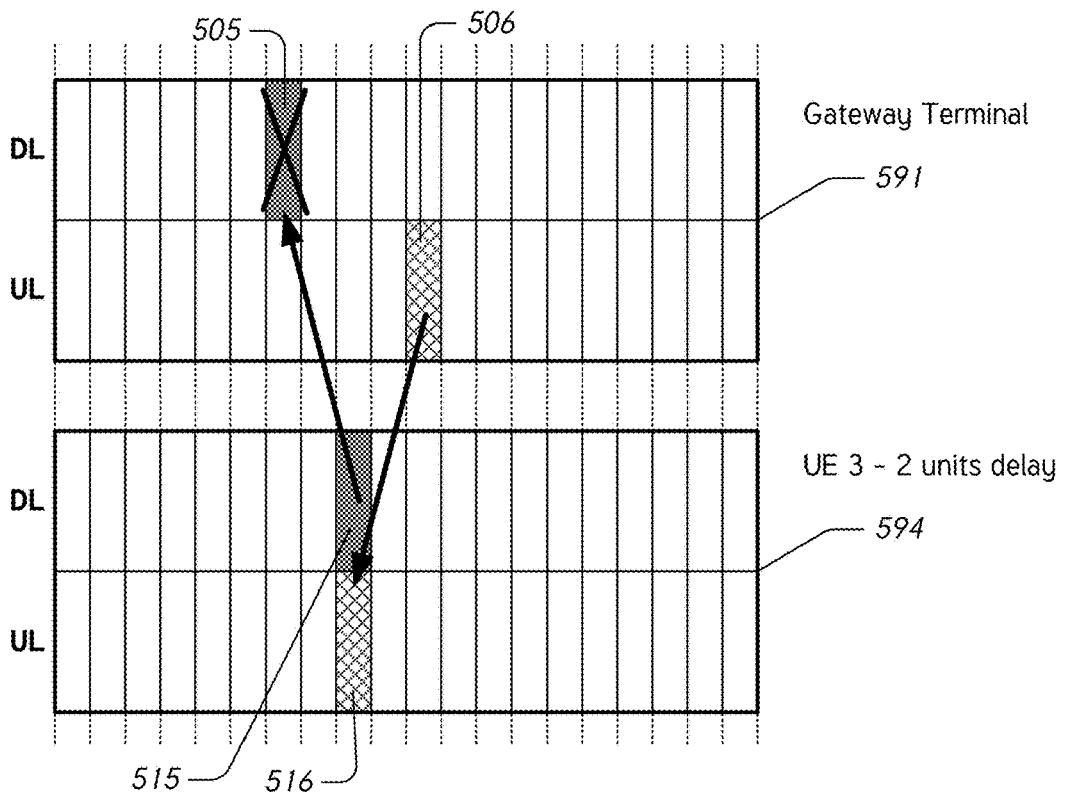
FIG. 5C illustrates an example of a scheduler determining a conflicting time slot for a gateway schedule and a third UE schedule.

FIG. 5C illustrates an example of a scheduler determining a conflicting time slot for a gateway schedule 591 and a third UE schedule 594. The propagation delay between the gateway and the third UE is about equal to the duration of two consecutive time slots. The scheduler can allocate an UL time slot 506 in the gateway schedule 591 which results in the scheduler allocating a corresponding UL time slot 516 in the third UE schedule 594, the UL time slots 506, 516 offset in time by two time slots due to the propagation delay. As a result, the scheduler identifies that allocating the DL time slot 505 in the gateway schedule 591 would result in a conflicting DL time slot 515 in the third UE schedule 594. Accordingly, the scheduler is configured to not allocate the DL time slot 505 to the gateway terminal for transmission to the third UE. However, the DL time slot 505 may be allocated for a different UE subject to the conflict analysis described herein.

Figure 5D:
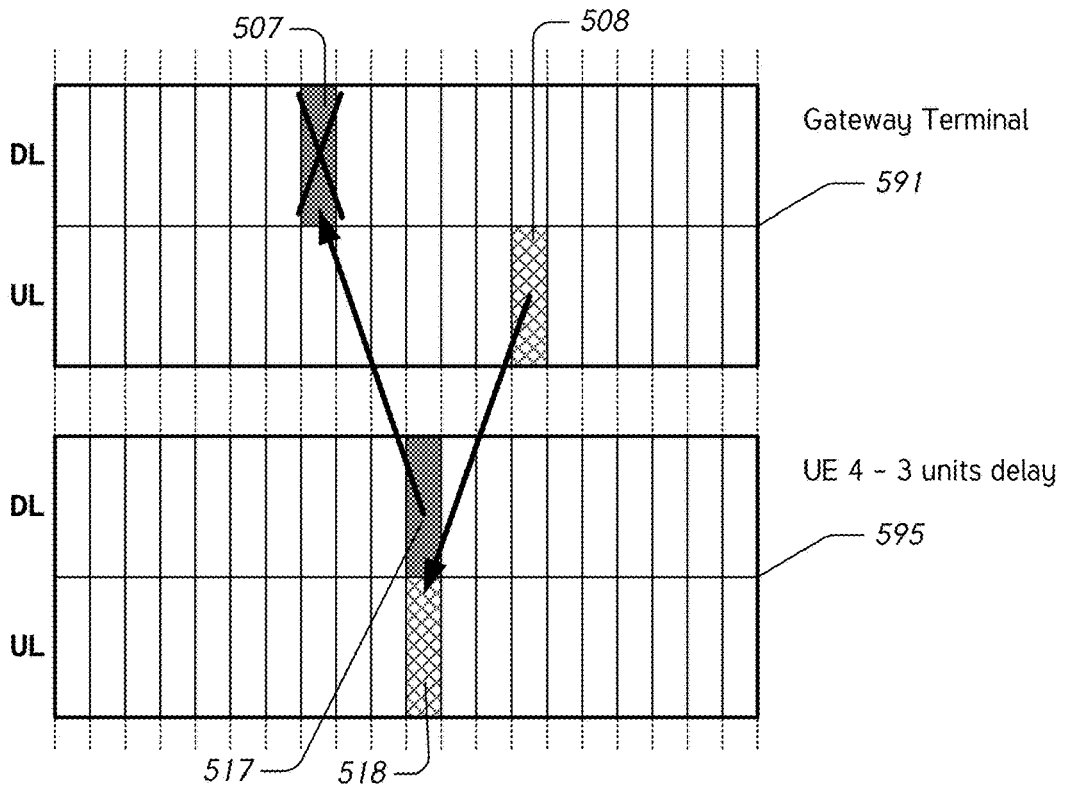
FIG. 5D illustrates an example of a scheduler determining a conflicting time slot for a gateway schedule and a fourth UE schedule.

FIG. 5D illustrates an example of a scheduler determining a conflicting time slot for a gateway schedule 591 and a fourth UE schedule 595. The propagation delay between the gateway and the fourth UE is about equal to the duration of three consecutive time slots. The scheduler can allocate an UL time slot 508 in the gateway schedule 591 which results in the scheduler allocating a corresponding UL time slot 518 in the fourth UE schedule 595, the UL time slots 508, 518 offset in time by three time slots due to the propagation delay. As a result, the scheduler identifies that allocating the DL time slot 507 in the gateway schedule 591 would result in a conflicting DL time slot 517 in the fourth UE schedule 595. Accordingly, the scheduler is configured to not allocate the DL time slot 507 to the gateway terminal for transmission to the fourth UE. However, the DL time slot 505 may be allocated for a different UE subject to the conflict analysis described herein.

FIGS. 5A-5D illustrate examples of a scheduler determining time slots that would be in conflict at a UE based on the propagation delay between the gateway terminal and the particular UE. This conflict analysis or conflict determination can be based on allocating one or more time slots at the gateway terminal and determining potentially conflicting time slots at the corresponding UE. The conflict analysis may also be based on determining potentially conflicting sets of time slots or time slots that cannot be allocated together in the same scheduling frame without resulting in conflicting time slots. For example, the set of potentially conflicting time slots in FIG. 5A includes DL time slot 501 and UL time slot 502, and consequently DL time slot 511 and UL time slot 512, meaning that both of these time slots cannot be allocated together for UE 1 in the same scheduling frame. Similarly, the set of conflicting time slots in FIG. 5B includes time slots 503 and 504 for UE 2, the set of conflicting time slots in FIG. 5C includes time slots 505 and 506 for UE 3, and the set of conflicting time slots in FIG. 5D includes time slots 507 and 508 for UE 4. The potentially conflicting time slots can be added as additional constraints to the scheduler when the scheduler goes to populate the schedules for the components in the communications system.

In some implementations, the scheduler can use one or more optimization schemes to determine which time slots to allocate. The optimization schemes may be configured to optimize utilization of network resources, satisfaction of service level agreements, satisfaction of scheduling priorities, or any combination of these or the like. For example, the scheduler can iterate through different potential schedules and select the schedule that does not violate any constraints, including the constraint against allocating time slots that would require a UE to simultaneously transmit and receive, and that has one or more superior or optimal metrics relative to the other schedules. In some implementations, the scheduler can populate DL time slots first and then determine UL time slots that would conflict if assigned. Based on these determinations, the scheduler can then populate non-conflicted UL time slots. In some implementations, the scheduler can populate UL time slots first and then determine DL time slots that would conflict if assigned. Based on these determinations, the scheduler can then populate non-conflicted DL time slots. In some implementations, the scheduler can populate time slots for a first UE, ensuring that the populated schedule for the first UE does not include conflicting time slots, before populating time slots for a second UE. In certain of these implementations, the order of populating schedules for UE can be based at least in part on a scheduling priority or similar parameter of each UE.

In some implementations, the process of generating a schedule includes deriving closed-form calculations to determine allowable, or non-conflicting, DL and UL time slots. For example, the schedule can be generated by representing the propagation delay of each UE mathematically and then solving the mathematical representation for a non-conflicted schedule.

Figure 6A:
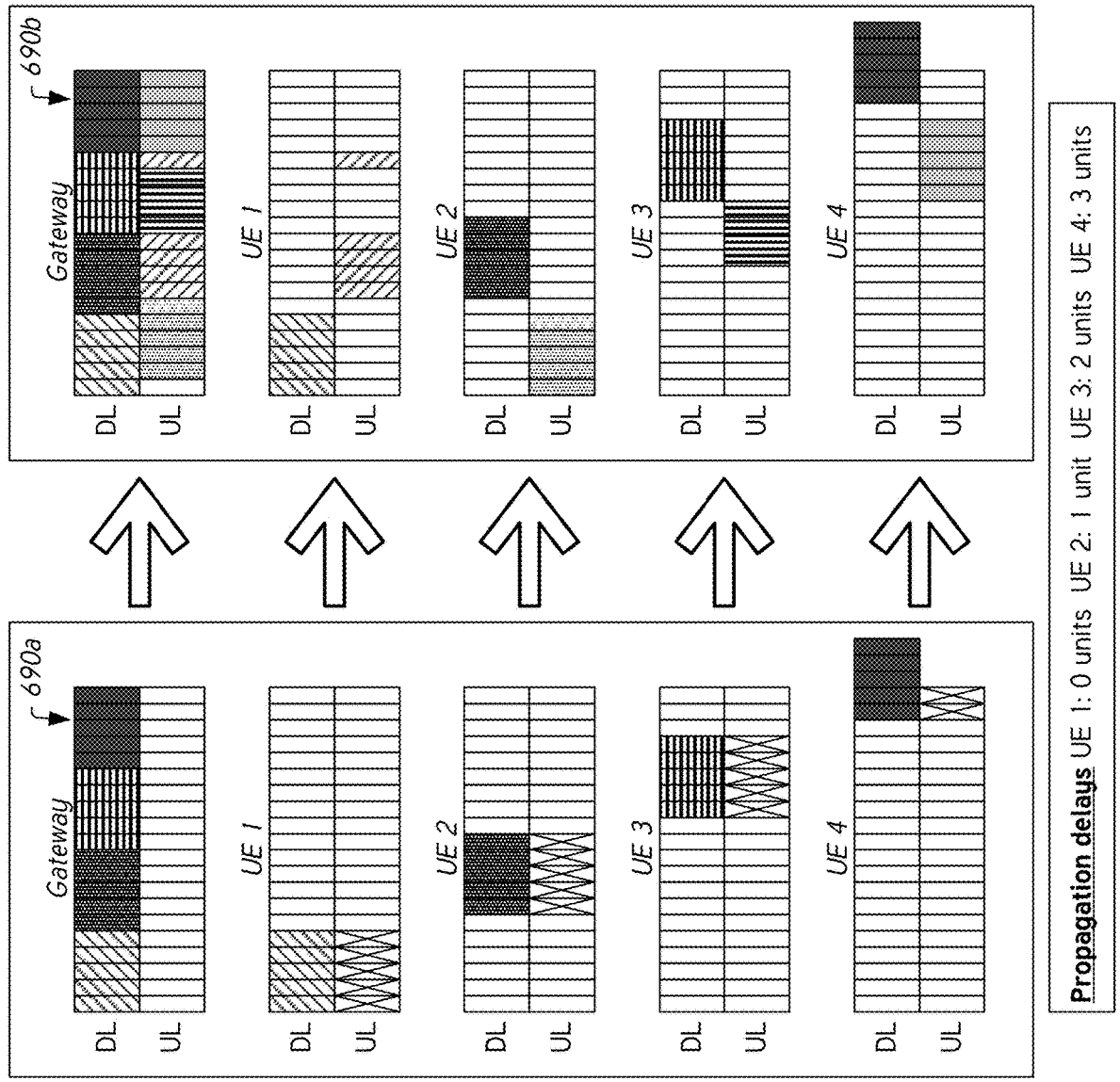
FIG. 6A illustrates an example of a process for populating a schedule for a gateway terminal and four UE, wherein each UE has a different propagation delay.

FIG. 6A illustrates an example of a process for populating a schedule for a gateway terminal and four UE, wherein each UE has a different propagation delay. Initially, the scheduler is configured to allocate equal portions of the network traffic to each UE. That is, initially the scheduler is configured to allocate approximately one-fourth of the network traffic to each UE. FIG. 6A illustrates a scheduling frame that has 20 slots, and this scheduling frame repeats in time. Thus, the scheduler initially allocates 5 DL slots to each UE. It should be noted that the scheduling frame can have a different number of time slots. It should also be noted that the scheduler can be configured to allocate unequal portions of the network traffic to the plurality of UE.

An initial step in the process is for the scheduler to determine the propagation delay associated with each UE. Here, the propagation delays are different for each UE, but that may not necessarily be the case in other situations. For example, one or more UE may have the same propagation delay (or a propagation delay that is sufficiently similar to other UE that it is treated as being the same at the scheduler). In some implementations, a sufficiently similar propagation delay may be one that is less than or equal to the duration of a time slot or less than or equal to fraction of the duration of a time slot (e.g., half). In this example, the first UE has a negligible propagation delay (e.g., less than or equal to half of a time slot), the second UE has a propagation delay approximately equal in duration to one time slot, the third UE has a propagation delay approximately equal in duration to two time slots, and the fourth UE has a propagation delay approximately equal in duration to three time slots.

After determining the propagation delays for each UE, the scheduler can determine potentially conflicting time slots (indicated with an 'X' in the figure). This can be accomplished by populating one or more time slots, such as the DL time slots for each UE, as illustrated in the schedules 690a in the box on the left of FIG. 6A. Based on the propagation delay, the potentially conflicting time slots can be identified and added to the constraints the scheduler uses to populate UL time slots in the scheduling frame. Once the scheduler determines these additional constraints based on potential time slot conflicts, the scheduler can iteratively populate the UL time slots resulting in the schedules 690b in the right box. With these schedules 690b determined, the scheduler can transmit the schedules to the corresponding components. That is, the scheduler can transmit the gateway schedule to the gateway terminal and the UE schedules to the corresponding UE.

There are a variety of algorithms that may be implemented to determine the potential conflicts in time slots. For example, a relationship between conflicting DL time slots and UL time slots can be determined based on the propagation delay for a particular UE. In UE 1 of FIG. 6A, the relationship would be that the gateway schedule cannot include a UL time slot that overlaps in time with a DL time slot. In UE 2 of FIG. 6A, the relationship would be that the gateway schedule cannot include a UL time slot that is two time slots later than a DL time slot. In UE 3 of FIG. 6A, the relationship would be that the gateway schedule cannot include a UL time slot that is four time slots later than a DL time slot. In UE 4 of FIG. 6A, the relationship would be that the gateway schedule cannot include a UL time slot that is eight time slots later than a DL time slot.

Similarly, there are a variety of algorithms that may be implemented to populate time slots subject to the constraints related to potential conflicts in time slots determined by the scheduler. For example, the scheduler can iteratively populate available time slots subject to the constraints. As another example, the scheduler can generate a plurality of potential schedules and select the schedule that improves or optimizes a particular metric or parameter, such as network utilization. As another example, the scheduler can allocate DL time slots (or UL time slots) based on initial constraints, or constraints that do not include potential time slot conflicts, then determine the potential time slot conflicts, and then allocate UL time slots (or DL time slots) subject to the initial constraints and the additional constraints related to potential time slot conflicts. In some implementations, the order in which the scheduler allocates network resources can be related to a scheduling priority for individual UE.

Figure 6B:
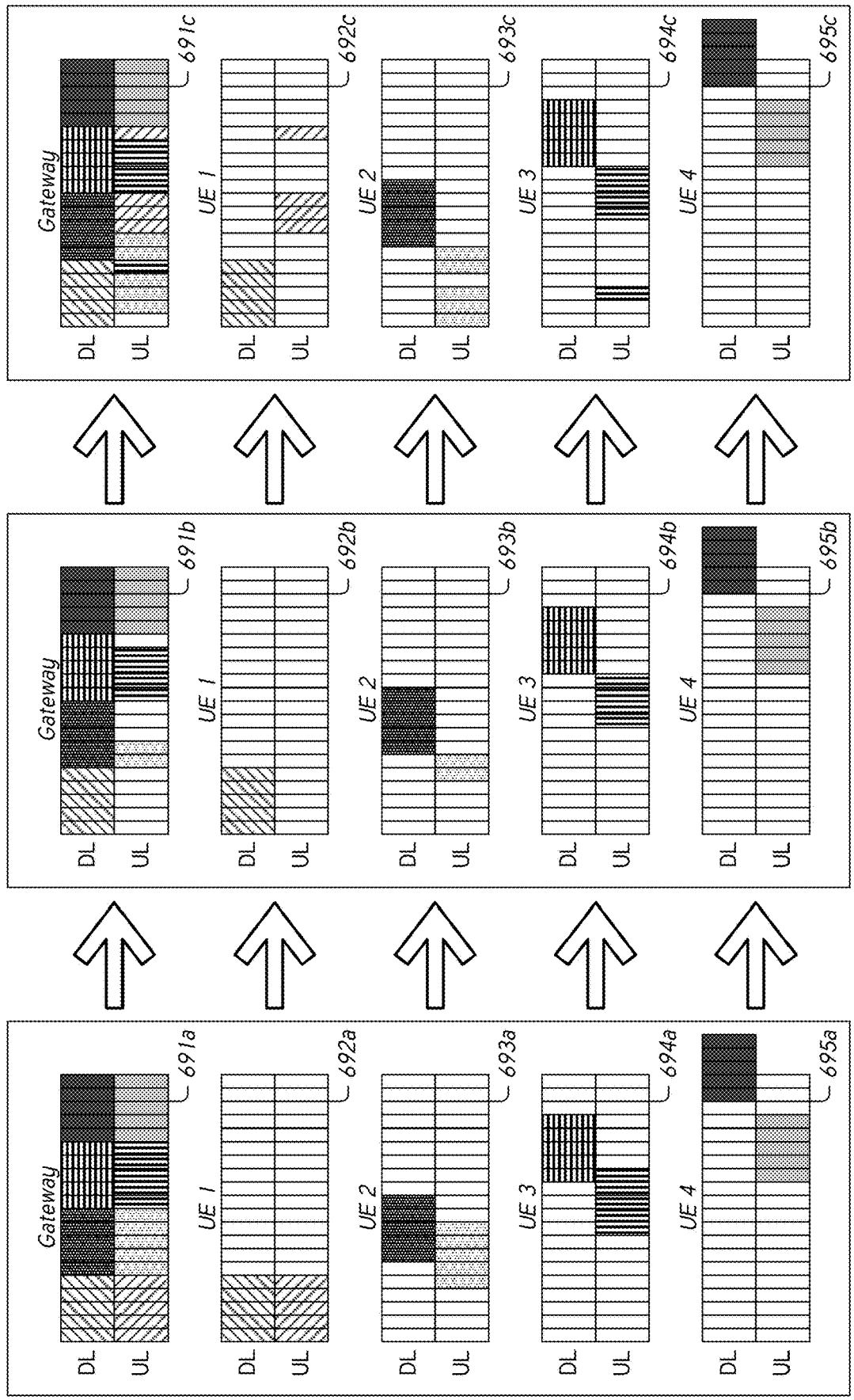
FIG. 6B illustrates an example algorithm for determining potentially conflicting time slots and for populating time slots subject to the determined potential conflicts constraints.

FIG. 6B illustrates an example algorithm for determining potentially conflicting time slots and for populating time slots subject to the determined potential conflicts constraints. The example uses the same configuration of components and the same propagation delays as the example of FIG. 6A. That is, there is a gateway terminal and four UE with propagation delays ranging from 0 time slots to 3 time slots.

Initially, the scheduler is configured to allocate equal portions of the network traffic to each UE. That is, initially each UE is allocated approximately one-fourth of the network traffic. In the example, the scheduling frame includes 20 time slots so that each UE is initially allocated five DL time slots and five UL time slots that are aligned in time at the gateway terminal. At each UE, the corresponding UE schedule indicates that the DL time slots are delayed and the UL time slots are time advanced corresponding to the propagation delay for the corresponding UE so that the DL time slots and the UL time slots are synchronized in time at the gateway terminal. For example, in the initial gateway schedule 691a, the five DL time slots and the five UL time slots for UE 1 overlap in time, the five DL time slots and the five UL time slots for UE 2 overlap in time, the five DL time slots and the five UL time slots for UE 3 overlap in time, and the five DL time slots and the five UL time slots for UE 4 overlap in time. This process results in initial schedules 692a, 693a, 694a, 695a for each of the four UE. The initial schedules 691a-695a include conflicting time slots at one or more of the plurality of UE.

In an intermediate step, the scheduler generates an intermediate gateway schedule 691b and corresponding intermediate schedules 692b, 693b, 694b, 695b for the plurality of UE. The scheduler generates the intermediate schedules by removing UL time slots that overlap in time with DL time slots at a particular UE. For example, the scheduler can remove all of the UL time slots for UE 1 because all of the UL time slots conflict with the DL time slots in the initial UE 1 schedule 692a, meaning that the intermediate UE 1 schedule 692b does not include any allocated UL time slots. Similarly, the scheduler can remove three UL time slots for UE 2 because these three UL time slots conflict with DL time slots in the initial UE 2 schedule 693a, meaning that the intermediate UE 2 schedule 693b includes two allocated UL time slots. Similarly, the scheduler can remove one UL time slot for UE 3 because that UL time slot conflicts with DL time slots in the initial UE 3 schedule 694a, meaning that the intermediate UE 3 schedule 694b includes four allocated UL time slots. The scheduler does not remove any UL time slots for UE 4 because there are no conflicting time slots in the initial UE 3 schedule 695a, meaning that the intermediate UE 4 schedule 695b is the same as the initial UE 4 schedule 695a. The removed UL time slots can be designated unfulfilled demand slots. The scheduler can be configured to track the unfulfilled demand slots to allocate in final schedules for the gateway terminal and the plurality of UE.

In a final step, the scheduler generates the final gateway schedule 691c and corresponding final schedules 692c, 693c, 694c, 695c for the plurality of UE. The scheduler generates the final schedules by placing the unfulfilled demand slots in the existing holes in the schedule. For example, there are four available holes for UE 1 that can be used and that do not violate the time slot conflict constraint. The scheduler thus allocates the four available holes to generate the final UE 1 schedule 692c. Similarly, there are five available holes for UE 2 that can be used and that do not violate the time slot conflict constraint. The scheduler thus allocates the five available holes to generate the final UE 2 schedule 693c. Similarly, there are five available holes for UE 3 that can be used and that do not violate the time slot conflict constraint. The scheduler thus allocates the five available holes to generate the final UE 3 schedule 694c. As noted above, there were no UL time slots removed for UE 4 such that UE 4 does not have any unfulfilled demand slots and the final UE 4 schedule 695c is the same as the intermediate UE 4 schedule 695b. It should be noted that not all of the unfulfilled demand slots are assigned in the final schedules 691c-695c. As described herein, different scheduling algorithms may be implemented that more efficiently allocate network resources. Such algorithms may be configured to allocate all unfulfilled demand slots, for example.

In some embodiments, the scheduling frame is loaded sequentially, as illustrated in FIGS. 6A and 6B. In certain embodiments, the scheduling frame is loaded non-sequentially. For example, the frame can be loaded in a back-and-forth pattern subject to one or more constraints, including the half duplex UE constraint.

In some embodiments, a scheduler can allocate network resources and the generated schedule can be good for multiple scheduling frames. For example, a schedule can be generated and remain unchanged for 1 or more milliseconds. By way of example, a scheduling frame can include time slots that are about 312.5 us in duration, with an individual scheduling frame lasting about 5 ms. The scheduling frame can be updated on the order of milliseconds, or every few scheduling frames. Relatedly, the propagation delay calculation or determination can be updated on the order of milliseconds to hundreds of milliseconds. In some embodiments, the propagation delay of one or more UE changes (e.g., as the one or more UE move or as the satellite moves, and so forth). In response, the scheduler can update or change the schedule. In some embodiments, the propagation delay of one or more UE varies over time.

Methods of Scheduling Network Resources for TDD UE in an FDD Network

Figure 7:
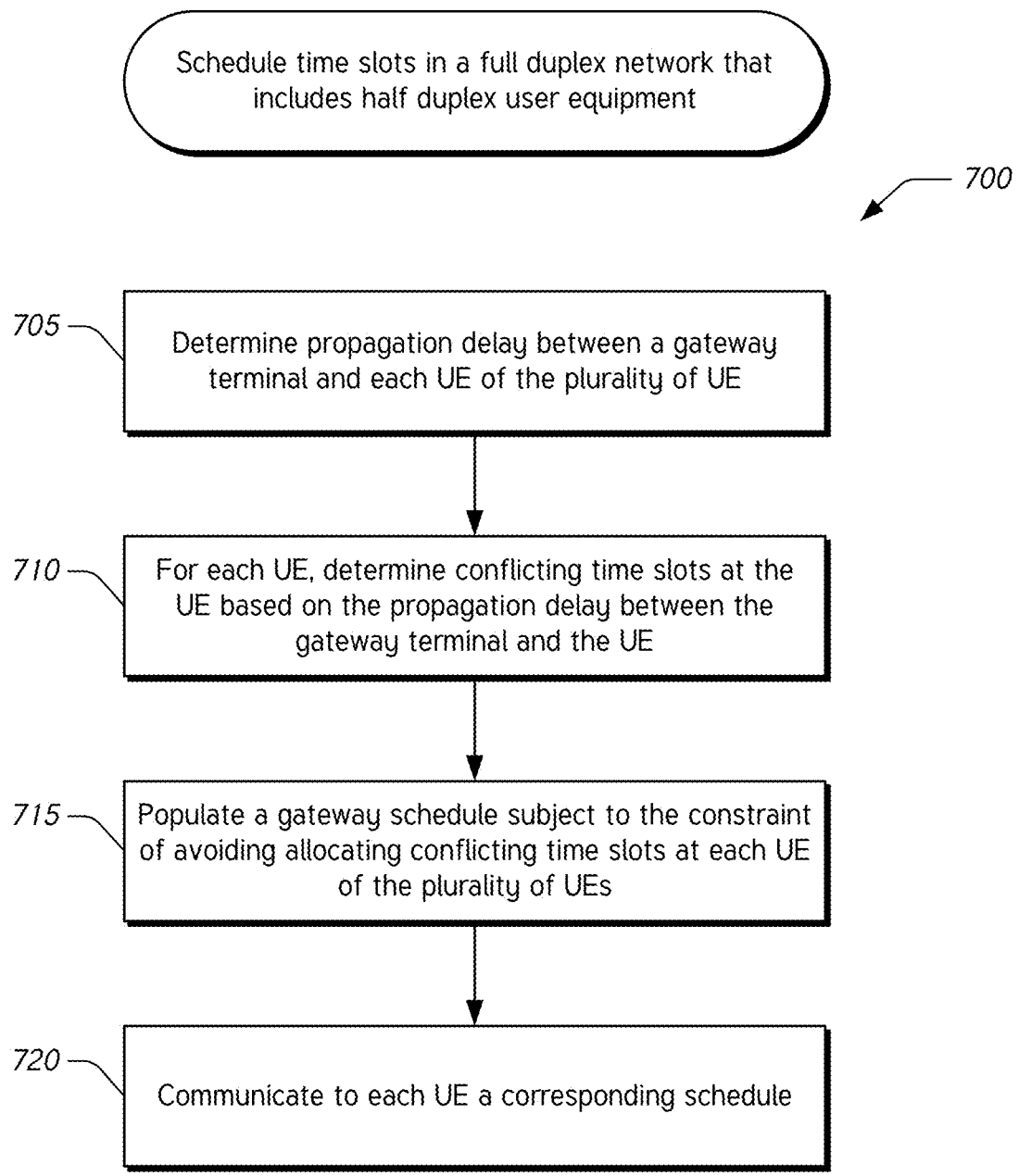
FIG. 7 illustrates a flow chart of an example method of scheduling time slots in a full duplex network that includes half duplex user equipment.

FIG. 7 illustrates a flow chart of an example method 700 of scheduling time slots in a full duplex network that includes half duplex user equipment. The method 700 can be performed in any of the schedulers described herein with reference to FIGS. 1 and 9. For ease of description, the method 700 will be described as being performed by a scheduler. This is not to be understood to limit the scope of the disclosure. Rather, any step or portion of the method 700 can be performed by any component or combination of components of the communications systems described herein.

In block 705, the scheduler determines a propagation delay between a gateway terminal and each UE of a plurality of UE. The propagation delay may be determined based on measurements made by the scheduler or other components of the communications system. The propagation delay may be calculated by the scheduler or another component in the communications system and then relayed to the scheduler.

In block 710, for each UE, the scheduler determines conflicting time slots at the UE based on the propagation delay between the gateway terminal and the UE. Conflicting time slots include time slots that violate the half duplex constraint. The half duplex constraint is a constraint that restricts allocating time slots to a particular UE that would require that UE to simultaneously transmit and receive. Conflicting time slots include DL time slots and UL time slots that overlap in time. In some implementations, the scheduler identifies conflicting time slots for individual UE at the gateway terminal based on the propagation delay between the gateway terminal and the individual UE. In other words, the scheduler identifies time slots that, if allocated at the gateway terminal, would violate the half duplex constraint at the UE to which the time slots are allocated. This determination may be based on calculating the position in time of one or more DL time slots at the UE by delaying in time the one or more DL time slots at the gateway terminal, the time delay equal to the corresponding propagation time. Similarly, this determination may be based on calculating the position in time of one or more UL time slots at the UE by advancing in time the one or more UL time slots at the gateway terminal, the time advance equal to the corresponding propagation time.

In block 715, the scheduler populates a gateway schedule subject to the constraint of avoiding allocating conflicting time slots at each UE of the plurality of UE. By identifying the conflicting time slots in block 710, the scheduler can be configured to allocate a time slot to a particular UE and, in response, to eliminate from the time slots that are available to the particular UE one or more time slots that conflict with the allocated time slot. For example, the scheduler can allocate a DL time slot to a particular UE and, in response, eliminate from the available time slots for the particular UE one or more UL time slots that conflict with the allocated DL time slot. As another example, the scheduler can allocate a UL time slot to a particular UE and, in response, eliminate from the available time slots for the particular UE one or more DL time slots that conflict with the allocated UL time slot.

In some implementations, the scheduler is configured to generate an uplink schedule for the gateway schedule. In such implementations, the scheduler can be configured to not explicitly send an explicit downlink schedule to each UE. For example, the downlink schedule may be inferred by the received packets from the UE. In some implementations, the scheduler generates and sends a partial schedule. The partial schedule includes only an uplink schedule for the gateway schedule.

In block 720, the scheduler communicates to each UE a corresponding schedule. In some implementations, the scheduler communicates the gateway schedule to each UE. In some implementations, the scheduler generates a corresponding UE schedule for each UE. The corresponding UE schedule includes the DL time slots allocated to the UE in the gateway schedule delayed in time an amount of time approximately equal to the propagation delay. The corresponding UE schedule also includes the UL time slots allocated to the UE in the gateway schedule advanced in time an amount of time approximately equal to the propagation delay. In such implementations, the scheduler communicates the corresponding UE schedule to the associated UE.

Figure 8:
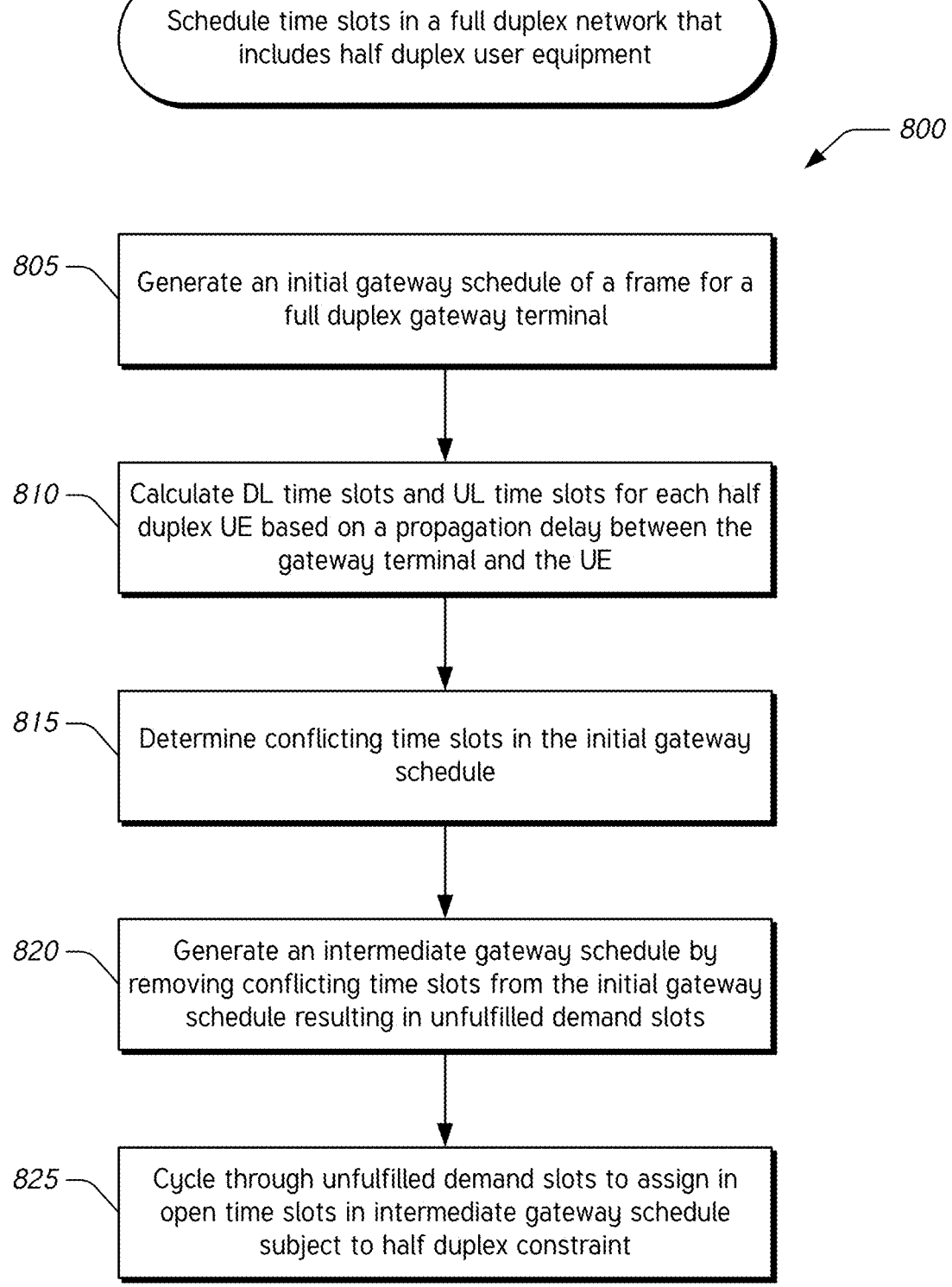
FIG. 8 illustrates a flow chart of another example method of scheduling time slots in a full duplex network that includes half duplex user equipment.

FIG. 8 illustrates a flow chart of an example method 800 of scheduling time slots in a full duplex network that includes half duplex user equipment. The method 800 can be performed in any of the schedulers described herein with reference to FIGS. 1 and 9. For ease of description, the method 800 will be described as being performed by a scheduler. This is not to be understood to limit the scope of the disclosure. Rather, any step or portion of the method 800 can be performed by any component or combination of components of the communications systems described herein.

In block 805, the scheduler determines an initial gateway schedule of a scheduling frame for a full duplex gateway terminal. The scheduler allocates a plurality of DL time slots to each UE and a plurality of UL time slots to each UE in the initial gateway schedule. The scheduler generates this initial gateway schedule without considering the half duplex constraint (e.g., the constraint that a UE cannot simultaneously transmit and receive).

In block 810, for each UE, the scheduler uses the propagation delay between the UE and the gateway terminal to determine an initial UE schedule. The initial UE schedule for each UE includes a plurality of DL time slots that corresponds to the plurality of DL time slots in the initial gateway schedule and a plurality of UL time slots that corresponds to the plurality of UL time slots in the initial gateway schedule. The plurality of DL time slots in the initial UE schedule are delayed in time relative to the plurality of DL time slots in the initial gateway schedule, the delay in time approximately equal to the propagation delay between the corresponding UE and the gateway terminal. Similarly, the plurality of UL time slots in the initial UE schedule are advanced in time relative to the plurality of UL time slots in the initial gateway schedule, the advance in time approximately equal to the propagation delay between the corresponding UE and the gateway terminal.

In block 815, the scheduler determines conflicting time slots in the initial gateway schedule. Conflicting time slots correspond to the time slots that overlap in time at a particular UE or that require the particular UE to simultaneously transmit and receive. The scheduler can determine the conflicting time slots using the initial UE schedules to identify DL time slots and UL time slots that overlap in time. For each time slot that violates the half duplex constraint at a particular UE, the scheduler can be configured to identify the corresponding time slot in the initial gateway schedule. Thus, the scheduler is configured to identify conflicting time slots in the initial gateway schedule that violate the half duplex constraint.

In block 820, the scheduler determines an intermediate gateway schedule by removing conflicting time slots from the initial gateway schedule. The resulting intermediate gateway does not violate the half duplex constraint. The conflicting time slots removed from the initial gateway schedule can be marked as unfulfilled demand slots by the scheduler. In some implementations, where one or more DL time slots conflict with one or more UL time slots, the scheduler can remove the one or more conflicting UL time slots to eliminate the corresponding time slot conflicts. This may be advantageous because there is typically less demand for UL time slots than for DL time slots. This means that unfulfilled UL demand slots, leading to UL inefficiencies, may be less detrimental or less disadvantageous than inefficiencies in the DL. In some implementations, where one or more DL time slots conflict with one or more UL time slots, the scheduler can remove the one or more conflicting DL time slots to eliminate the corresponding time slot conflicts. In some embodiments, the scheduler determines corresponding intermediate UE schedules for each UE based on the propagation delay between the gateway terminal and the corresponding UE, as described above with respect to the initial UE schedules.

In block 825, the scheduler generates a final gateway schedule by cycling through the unfulfilled demand slots and assigning the unfulfilled demand slots in open time slots in the intermediate gateway schedule subject to the half duplex constraint. The scheduler can be configured to generate final UE schedules for each UE based on the propagation delay between the gateway terminal and the corresponding UE, as described above with respect to the initial UE schedules. In some implementations, one or more unfulfilled demand slots are unassigned in the final gateway schedule. In some implementations, the scheduler can implement one or more heuristics to assign the unfulfilled demand slots to the final gateway schedule.

In some implementations, the scheduler is configured to try different combinations of time slots to determine a superior or optimal final gateway schedule. This may be done in place of blocks 820 and 825 to find a superior or optimal final gateway schedule that complies with the half duplex constraint. In some implementations, the scheduler is configured to implement an algorithmic optimization routine, such as linear programming, to determine a superior or optimal final gateway schedule based on the initial gateway schedule, subject to the half duplex constraint.

In some implementations, the scheduler is configured to communicate the final gateway schedule to the gateway terminal and to communicate the final UE schedules to the corresponding UE. In some implementations, the initial and intermediate schedules described with respect to the method 800 are not generated but are virtual constructs that are used by the scheduler to facilitate generating the final schedules.

Example Scheduler

Figure 9:
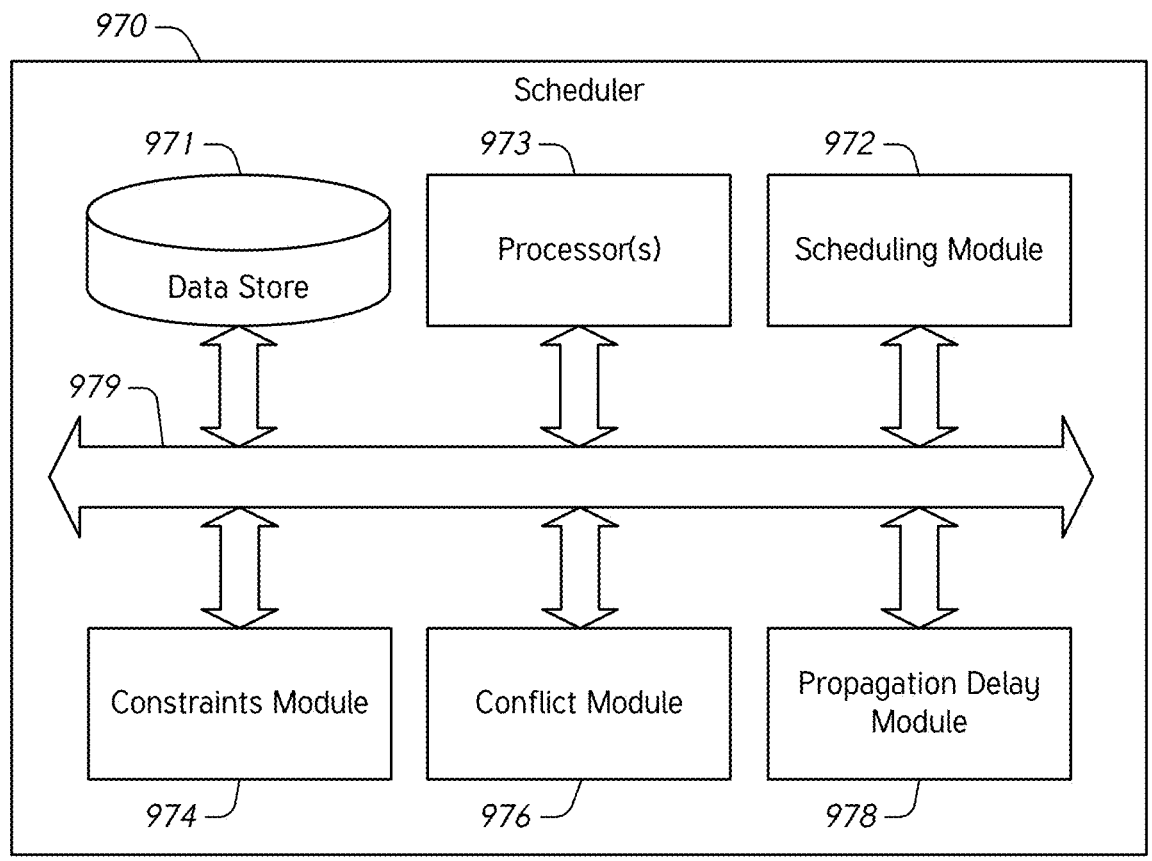
FIG. 9 illustrates a block diagram of an example scheduler configured to schedule time slots in a full duplex network that includes half duplex user equipment.

FIG. 9 illustrates a block diagram of an example scheduler 970 configured to schedule time slots in a full duplex network that includes half duplex user equipment. The scheduler 970 is similar to the scheduler 170 described herein with reference to FIG. 1 and can be implemented in any of the communications systems described herein. The scheduler 970 can employ any method described herein for coordinating operation of access nodes with complementary schedules, such as the example methods 700 and 800 described herein with reference to FIGS. 7 and 8, respectively.

The scheduler 970 can include hardware, software, and/or firmware components for coordinating operation of access nodes in a satellite communications system. The scheduler 970 includes a data store 971, one or more processors 973, a scheduling module 972, a constraints module 974, a conflict module 976, and a propagation delay module 978. Components of the scheduler 970 can communicate with one another, with external systems, and with other components of a network using communication bus 979. The scheduler 970 can be implemented using one or more computing devices. For example, the scheduler 970 can be implemented using a single computing device, multiple computing devices, a distributed computing environment, or it can be located in a virtual device residing in a public or private computing cloud. In a distributed computing environment, one or more computing devices can be configured to provide the modules 972, 974, 976, and 978 to provide the described functionality.

The scheduler 970 includes the scheduling module 972 to generate a gateway schedule and/or a UE schedule for each UE communicating with a particular gateway terminal. The schedule module 972 is configured to generate the schedules based on constraints from the constraints module 974. The scheduler allocates network resources based on constraints as well as priorities, weights, proportions of network traffic to allocate to different network flows, channel conditions, and the like. Consequently, there are a number of different ways to allocate network resources in a schedule. The scheduling module 972 can be configured to track available slots in a frame and perform algorithms or heuristics to allocate time slots to UE, which may be done using optimization techniques. For example, based on the constraints module 974 and the conflict module 976, the scheduling module 972 is aware that certain slots are unavailable for each UE, so the scheduling module 972 can be configured to track as many time slots as possible to efficiently or optimally allocate open and available time slots.

The scheduler 970 includes the constraints module 974 to identify and enforce constraints on the scheduling module 972. As a result, the schedules generated by the scheduling module 972 do not violate the constraints identified by the constraints module 974. The constraints module 974 is configured to receive additional constraints from the conflict module 976.

The scheduler 970 includes the conflict module 976 to identify potentially conflicting time slots for the gateway based on a requirement that a UE not simultaneously transmit and receive. This may be referred to as a half duplex constraint. Conflicting time slots are thus DL and UL time slots that overlap in time at a particular UE. To determine potentially conflicting time slots, the conflict module 976 uses a propagation delay associated with a particular UE, the propagation delay received from the propagation delay module 978.

The scheduler 970 includes the propagation delay module 978 to determine a propagation delay for each UE in the communications system. The propagation delay corresponds to the amount of time a signal takes to travel from the gateway terminal to a particular UE. The propagation time is used by the conflict module 976 to identify potentially conflicting time slots.

The scheduler 970 includes one or more processors 973 that are configured to control operation of the modules 972, 974, 976, 978 and the data store 971. The one or more processors 973 implement and utilize the software modules, hardware components, and/or firmware elements configured to schedule time slots for a plurality of UE and a gateway terminal. The one or more processors 973 can include any suitable computer processors, application-specific integrated circuits (ASICs), field programmable gate array (FPGAs), or other suitable microprocessors. The one or more processors 973 can include other computing components configured to interface with the various modules and data stores of the scheduler 970.

The scheduler 970 includes the data store 971 configured to store configuration data, analysis parameters, control commands, databases, algorithms, executable instructions (e.g., instructions for the one or more processors 973), and the like. The data store 971 can be any suitable data storage device or combination of devices that include, for example and without limitation, random access memory, read-only memory, solid-state disks, hard drives, flash drives, bubble memory, and the like.

Additional Embodiments and Terminology

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional subcomponents to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some aspects of the systems and methods described herein can advantageously be implemented using, for example, computer software, hardware, firmware, or any combination of computer software, hardware, and firmware. Computer software can comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that can be implemented using software to be executed on a general purpose computer can also be implemented using a different combination of hardware, software, or firmware. For example, such a module can be implemented completely in hardware using a combination of integrated circuits. Alternatively or additionally, such a feature or function can be implemented completely or partially using specialized computers designed to perform the particular functions described herein rather than by general purpose computers.

Multiple distributed computing devices can be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that can direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method for scheduling time slots in a frame for a gateway terminal and a plurality of user equipment (UE) in a communications system, the method comprising:

determining a propagation delay between the gateway terminal and each UE of the plurality of UE;

determining, for each UE of the plurality of UE, one or more conflicting time slots at the UE based on the propagation delay between the gateway terminal and the UE, a conflicting time slot being a time slot in which the UE is scheduled to simultaneously transmit and receive;

populating a gateway schedule subject to a constraint to avoid conflicting time slots at each UE of the plurality of UE by:

generating a plurality of potential gateway schedules that avoid conflicting time slots at each UE of the plurality of UE; and selecting as the gateway schedule a potential gateway schedule from the plurality of potential gateway schedules that improves network utilization relative to unselected potential gateway schedules of the plurality of potential gateway schedules; and communicating a schedule that corresponds to the gateway schedule to each UE of the plurality of UE.

2. The method of claim 1, wherein the schedule that corresponds to the gateway schedule for a particular UE includes a schedule with downlink time slots delayed in time relative to the gateway schedule, the delay in time equal to the propagation time associated with the particular UE, and with uplink time slots advanced in time relative to the gateway schedule, the advance in time equal to the propagation time associated with the particular UE.

3. The method of claim 1, wherein populating the gateway schedule includes, for each UE of the plurality of UE, allocating a plurality of downlink time slots.

4. The method of claim 3, wherein populating the gateway schedule further includes, for each UE of the plurality of UE, identifying one or more uplink slots that violate the constraint to avoid conflicting time slots due at least in part to the one or more uplink slots overlapping in time with one or more of the plurality of downlink time slots.

5. The method of claim 1, wherein populating the gateway schedule includes, for each UE of the plurality of UE, allocating a plurality of uplink time slots.

6. The method of claim 5, wherein populating the gateway schedule further includes, for each UE of the plurality of UE, identifying one or more downlink slots that violate the constraint to avoid conflicting time slots due at least in part to the one or more downlink slots overlapping in time with one or more of the plurality of uplink time slots.

7. The method of claim 1, wherein the propagation delay of a particular UE changes.

8. The method of claim 7, wherein the gateway schedule is updated responsive to a change in the propagation delay of the particular UE.

9. The method of claim 7, wherein the propagation delay of the particular UE varies over time.

10. A scheduler in a communications system that includes a gateway terminal and a plurality of user equipment (UE), the scheduler comprising:

a data store configured to store computer executable instructions for scheduling downlink and uplink time slots of a frame in the communications system; and a processor in communication with the data store, the processor configured to execute the computer executable instructions to perform the following:

determine a propagation delay between the gateway terminal and each UE of the plurality of UE;

determine, for each UE of the plurality of UE, one or more conflicting time slots at the UE based on the propagation delay between the gateway terminal and the UE, a conflicting time slot being a time slot in which the UE is scheduled to simultaneously transmit and receive;

populate a gateway schedule subject to a constraint to avoid conflicting time slots at each UE of the plurality of UE by:

generate a plurality of potential gateway schedules that avoid conflicting time slots at each UE of the plurality of UE; and select as the gateway schedule a potential gateway schedule from the plurality of potential gateway schedules that improves network utilization relative to unselected potential gateway schedules of the plurality of potential gateway schedules; and communicate a schedule that corresponds to the gateway schedule to each UE of the plurality of UE.

11. The scheduler of claim 10, wherein the scheduler is incorporated into the gateway terminal of the communications system.

12. The scheduler of claim 10, wherein the schedule that corresponds to the gateway schedule for a particular UE includes a schedule with downlink time slots delayed in time relative to the gateway schedule, the delay in time equal to the propagation time associated with the particular UE, and with uplink time slots advanced in time relative to the gateway schedule, the advance in time equal to the propagation time associated with the particular UE.

13. The scheduler of claim 10, wherein populating the gateway schedule includes, for each UE of the plurality of UE, allocating a plurality of downlink time slots.

14. The scheduler of claim 13, wherein populating the gateway schedule further includes, for each UE of the plurality of UE, identifying one or more uplink slots that violate the constraint to avoid conflicting time slots due at least in part to the one or more uplink slots overlapping in time with one or more of the plurality of downlink time slots.

15. The scheduler of claim 10, wherein the propagation delay of a particular UE changes.

16. The scheduler of claim 15, wherein the gateway schedule is updated responsive to a change in the propagation delay of the particular UE.

17. The scheduler of claim 15, wherein the propagation delay of the particular UE varies over time.

18. A communications system comprising:

a plurality of user equipment (UE) configured for half duplex operation;

a gateway terminal configured for full duplex operation, the gateway terminal configured to communicate with each UE of the plurality of UE; and a scheduler in communication with the gateway terminal, the scheduler configured to schedule time slots of a frame in the communications system by performing the following:

determine a propagation delay between the gateway terminal and each UE of the plurality of UE;

determine, for each UE of the plurality of UE, one or more conflicting time slots at the UE based on the propagation delay between the gateway terminal and the UE, a conflicting time slot being a time slot in which the UE is scheduled to simultaneously transmit and receive;

populate a gateway schedule subject to a constraint to avoid conflicting time slots at each UE of the plurality of UE by:

generate a plurality of potential gateway schedules that avoid conflicting time slots at each UE of the plurality of UE; and select as the gateway schedule a potential gateway schedule from the plurality of potential gateway schedules that improves network utilization relative to unselected potential gateway schedules of the plurality of potential gateway schedules; and communicate a schedule that corresponds to the gateway schedule to each UE of the plurality of UE.

19. The communications system of claim 18, wherein the scheduler is incorporated into the gateway terminal of the communications system.

20. The communications system of claim 18, wherein the schedule that corresponds to the gateway schedule for a particular UE includes a schedule with downlink time slots delayed in time relative to the gateway schedule, the delay in time equal to the propagation time associated with the particular UE, and with uplink time slots advanced in time relative to the gateway schedule, the advance in time equal to the propagation time associated with the particular UE.

21. The communications system of claim 18, wherein populating the gateway schedule includes, for each UE of the plurality of UE, allocating a plurality of downlink time slots.

22. The communications system of claim 21, wherein populating the gateway schedule further includes, for each UE of the plurality of UE, identifying one or more uplink slots that violate the constraint to avoid conflicting time slots due at least in part to the one or more uplink slots overlapping in time with one or more of the plurality of downlink time slots.

23. The communications system of claim 18, wherein populating the gateway schedule includes, for each UE of the plurality of UE, allocating a plurality of uplink time slots.

24. The communications system of claim 23, wherein populating the gateway schedule further includes, for each UE of the plurality of UE, identifying one or more downlink slots that violate the constraint to avoid conflicting time slots due at least in part to the one or more downlink slots overlapping in time with one or more of the plurality of uplink time slots.

25. The communications system of claim 18, wherein the propagation delay of a particular UE changes.

26. The communications system of claim 25, wherein the gateway schedule is updated responsive to a change in the propagation delay of the particular UE.

27. The communications system of claim 25, wherein the propagation delay of the particular UE varies over time.

28. The communications system of claim 18, wherein at least one UE of the plurality of UE has a propagation delay that is greater than or equal to a duration of one time slot in the gateway schedule.

29. The communications system of claim 28, wherein at least one UE of the plurality of UE has a propagation delay that is greater than or equal to a duration of two consecutive time slots in the gateway schedule.

* * * * *